US009629073B2

(12) United States Patent
Chu et al.

(10) Patent No.: US 9,629,073 B2
(45) Date of Patent: *Apr. 18, 2017

(54) COMMUNICATION METHOD BETWEEN A DEVICE AND ANOTHER DEVICE

(71) Applicant: LG ELECTRONICS INC., Seoul (KR)

(72) Inventors: Younsung Chu, Gyeonggi-do (KR); Jean-Francois Deprun, Paris (FR); Jihye Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 90 days.

This patent is subject to a terminal disclaimer.

(21) Appl. No.: 14/669,263

(22) Filed: Mar. 26, 2015

(65) Prior Publication Data

US 2015/0201372 A1 Jul. 16, 2015

Related U.S. Application Data

(63) Continuation of application No. 13/702,108, filed as application No. PCT/KR2011/004098 on Jun. 3, 2011, now Pat. No. 9,001,762.

(Continued)

(51) Int. Cl.
*H04W 48/16* (2009.01)
*H04L 12/24* (2006.01)
(Continued)

(52) U.S. Cl.
CPC ......... *H04W 48/16* (2013.01); *H04L 41/0813* (2013.01); *H04L 65/102* (2013.01);
(Continued)

(58) Field of Classification Search
CPC ... H04L 67/10; H04L 67/104; H04L 67/1042; H04L 67/1044; H04L 67/1046;
(Continued)

(56) References Cited

U.S. PATENT DOCUMENTS 6,744,740 B2 6/2004 Chen
6,965,575 B2 * 11/2005 Srikrishna ............... H04L 45/00
370/238

(Continued)

FOREIGN PATENT DOCUMENTS

KR 10-2010-0020925 A 2/2010
KR 10-2010-0050614 A 5/2010
(Continued)

OTHER PUBLICATIONS

Search Report issued in corresponding International Application No. PCT/KR2011/004098 dated Feb. 10, 2012.
(Continued)

*Primary Examiner* — Benjamin H Elliott, IV
(74) *Attorney, Agent, or Firm* — Morgan, Lewis & Bockius LLP

(57) ABSTRACT

Provided is a method for communicating with another device through a first device. The communication method includes: receiving a discovery request message including information regarding a mode of a second device; transmitting a discovery response message including information regarding a mode of a first device; receiving a gateway change request message for requesting mode switching to a combined mode from the second device; transmitting a gateway change response message with a result for the requesting to the second device; and changing the mode of the first device to the combined mode if the first device accepts the requesting, wherein the combined mode is a mode in which the first device operates as both a gateway of a first network and a member of a second network simultaneously.

9 Claims, 20 Drawing Sheets

Related U.S. Application Data

(60) Provisional application No. 61/419,877, filed on Dec. 6, 2010, provisional application No. 61/417,464, filed on Nov. 29, 2010, provisional application No. 61/416,301, filed on Nov. 23, 2010, provisional application No. 61/412,396, filed on Nov. 11, 2010, provisional application No. 61/386,954, filed on Sep. 27, 2010, provisional application No. 61/382,901, filed on Sep. 14, 2010, provisional application No. 61/377,910, filed on Aug. 27, 2010, provisional application No. 61/373,863, filed on Aug. 15, 2010, provisional application No. 61/353,667, filed on Jun. 11, 2010, provisional application No. 61/353,634, filed on Jun. 10, 2010, provisional application No. 61/352,800, filed on Jun. 8, 2010, provisional application No. 61/351,918, filed on Jun. 6, 2010.

(51) Int. Cl.
*H04W 88/06* (2009.01)
*H04W 4/00* (2009.01)
*H04L 29/06* (2006.01)
*H04W 4/02* (2009.01)
*H04W 48/04* (2009.01)
*H04W 88/16* (2009.01)

(52) U.S. Cl.
CPC .......... *H04W 4/008* (2013.01); *H04W 4/021* (2013.01); *H04W 48/04* (2013.01); *H04W 88/06* (2013.01); *H04W 88/16* (2013.01)

(58) Field of Classification Search
CPC ........ H04L 45/00; H04L 45/02; H04L 45/26; H04L 41/08; H04L 41/0803; H04L 41/0813; H04L 41/12; H04L 65/102
See application file for complete search history.

(56) References Cited

U.S. PATENT DOCUMENTS

| | | | |
|---|---|---|---|
| 8,751,617 B2* | 6/2014 | Claes | H04L 12/5692 709/223 |
| 9,001,762 B2* | 4/2015 | Chu | H04W 88/06 370/329 |
| 2002/0146981 A1 | 10/2002 | Saint-Hilaire et al. | |
| 2002/0181443 A1 | 12/2002 | Coffey et al. | |
| 2007/0171878 A1 | 7/2007 | Souissi et al. | |
| 2009/0141653 A1 | 6/2009 | McNeill et al. | |
| 2009/0147702 A1 | 6/2009 | Buddhikot et al. | |
| 2009/0238099 A1 | 9/2009 | Ahmavaara | |
| 2009/0285126 A1 | 11/2009 | Lu et al. | |
| 2010/0008275 A1 | 1/2010 | Lee et al. | |
| 2010/0040032 A1 | 2/2010 | Jeon et al. | |
| 2011/0026436 A1 | 2/2011 | Karaoguz et al. | |
| 2011/0026477 A1* | 2/2011 | Sinivaara | H04L 45/308 370/329 |
| 2011/0183760 A1 | 7/2011 | Kim et al. | |
| 2012/0287822 A1 | 11/2012 | Jeon et al. | |
| 2013/0077531 A1* | 3/2013 | Chu | H04W 88/06 370/255 |
| 2015/0201372 A1* | 7/2015 | Chu | H04W 88/06 370/254 |

FOREIGN PATENT DOCUMENTS

| | | |
|---|---|---|
| KR | 10-2010-0050620 A | 5/2010 |
| WO | 2009-120666 A1 | 10/2009 |

OTHER PUBLICATIONS

International Search Report issued in corresponding International Application No. PCT/KR2011/004097 dated Dec. 13, 2011.
Open Mobile Alliance, "Converged Personal Network Service Requirements," Nov. 2009, Version 1.0-17, pp. 10, 11, and 26.

* cited by examiner

COMMUNICATION METHOD BETWEEN A DEVICE AND ANOTHER DEVICE

CROSS REFERENCE TO RELATED APPLICATIONS

The present application is a continuation of U.S. patent application Ser. No. 13/702,108, filed on Dec. 5, 2012, the entire disclosure of which is hereby incorporated by reference for all purposes as if fully set forth herein. U.S. patent application Ser. No. 13/702,108 is a U.S. National Stage Entry of PCT International Application No. PCT/KR11/04098, filed on Jun. 3, 2011, and claims the benefit of U.S. Provisional Applications No. 61/419,877, filed on Dec. 6, 2010; No. 61/417,464, filed on Nov. 29, 2010; No. 61/416,301, filed on Nov. 23, 2010; No. 61/412,396, filed on Nov. 11, 2010; No. 61/386,954, filed on Sep. 27, 2010; No. 61/382,901, filed on Sep. 14, 2010; No. 61/377,910, filed on Aug. 27, 2010; No. 61/373,863, filed on Aug. 15, 2010; No. 61/353,667, filed on Jun. 11, 2010; No. 61/353,634, filed on Jun. 10, 2010; No. 61/352,800, filed on Jun. 8, 2010; and No. 61/351,918, filed on Jun. 6, 2010.

TECHNICAL FIELD

The present invention relates to a CPNS (Converged Personal Network Service).

BACKGROUND ART

Among various developed technologies, DLNA or ZigBee is focused on discovery and use of services of devices in a specific PAN and tethering technology places emphasis on connection between heterogeneous networks.

A CPNS different from the simple PAN has been proposed.

The CPNS enables devices to belong to a PN (Personal network) (or PAN (Personal Area Network)) to be provided with various services.

The CPNS is implemented through a CPNS server, a CPNS gateway, and a device supporting the CPNS. In addition, a general server, general devices, etc. may be present for the CPNS.

The CPNS is based on a personal network corresponding to a group of devices. The CPNS gateway is located in the PN and services of the devices are registered in the CPNS server through the CPNS gateway such that a device providing a predetermined service can be discovered through the CPNS server and an external entity can share the service provided by the device on the basis of the discovery.

The CPNS gateway connects the PN (also called a gateway (GW)) to another network. The CPNS device is also called a PNE (Personal Network Entity) and is a member of the PN. A plurality of devices may be grouped to form a PNE or a single device may be a PNE.

FIG. 1 illustrates the concept of the CPNS.

Referring to FIG. 1, a general server, a CPNS server, a CPNS gateway, a CPNS device and a general device are shown.

The CPNS server can communicate with one or more CPNS gateways (that is, PN gateways) and transmit/receive data. The CPNS server can communicate with one or more CPNS devices in a PN (or PNA) through the CPNS gateway to exchange data with the CPNS devices.

Each CPNS device can transmit/receive data to/from one or more other CPNS devices or general devices through the CPNS gateway.

The CPNS gateway can communicate with the CPNS server, a CPNS gateway belonging to a different PN, or the CPNS device to transmit/receive data.

The CPNS server can communicate with general servers and the CPNS gateway to transmit/receive data.

For example, the CPNS server and the CPNS gateway can communicate with each other using a cellular network and the CPNS gateway and the CPNS device can communicate with each other using short range communication, for example, Bluetooth, NFC, ZigBee, WiFi, etc.

The CPNS server administrates and controls communication between the CPNS gateway and the CPNS device, and thus applications and information are exchanged between the CPNS gateway and the CPNS device, increasing user convenience. For example, according to the configuration of FIG. 1, a user can acquire position information using an arbitrary CPNS device from another CPNS device (e.g. GPS), transmit the position information to the CPNS server through the CPNS gateway and be provided with a location based service from the CPNS server.

Accordingly, the user can be provided with various services through a plurality of CPNS devices that belong to the PN.

DISCLOSURE

Technical Problem

The above-described conventional technology proposes only the concept of the CPNS and does not provide technical specifications necessary to implement the CPNS.

Therefore, an object of the present invention is to provide a detailed technique to implement the CPNS.

Technical Solution

According to one aspect of the present invention, there is provided a method for communicating with another device through a first device including a Converged Personal network Service (CPNS) enabled entity. The method may include receiving a discovery request message including information regarding the mode of a second device when the CPNS enabled entity of the first device, set to a gateway mode, moves into the coverage of a second network managed by the second device. The CPNS enabled entity may manage a first network, and one or more entities capable of receiving a first service through the CPNS enabled entity set to the gateway mode may be present in the first network. The method may further include confirming whether one or more available PNEs are present in both coverages of the first network and the second network upon confirming that a CPNS enable entity of the second device is set to a gateway on the basis of the mode information, and determining whether to switch the mode of the CPNS enable entity of the first device on the basis of presence or absence of the one or more available PNEs and the mode of the second device. The mode of the CPNS enabled entity of the first device may be switched from the gateway mode to a combined mode according to the result of the determination.

That the mode of the CPNS enabled entity of the first device is switched to the combined mode may be determined upon confirming that the one or more entities are located outside the coverage of the second network or the one or more entities cannot directly receive a service of the second network through the second device although the one or more entities are located in the coverage of the second network.

That the mode of the CPNS enabled entity of the first device is not switched to the combined mode may be determined upon confirming that all PNEs that belong to the first network are located in the coverage of the second network and are available to receive the service of the second network.

That the mode of the CPNS enabled entity of the first device is not switched to the combined mode may be determined upon confirming that, although some PNEs belonging to the first network are not located in the coverage of the second network, the remaining PNEs that need to use the service of the second network are located in the coverage of the second network.

The available PNEs may be located in the coverage of the second network, support a communication scheme of the second network, and have sufficient power to receive the service of the second network.

The determining of whether to switch the mode of the CPNS enable entity of the first device may include the CPNS enabled entity of the first device checking mode information thereof.

The mode of the CPNS enabled entity of the first device may be switched to the combined mode upon confirming that the CPNS enabled entity is operable in the gateway mode and a PNE mode simultaneously from the checking result of the mode information of the CPNS enabled entity.

The combined mode may correspond to a mode in which the CPNS enabled entity operates in the gateway mode and PNE mode, simultaneously.

The method may further include: the CPNS enabled entity of the first device receiving service data of the second network from the second device, as a PNE, after the mode of the CPNS enabled entity is switched to the combined mode; and the CPNS enabled entity of the first device transmitting the service data to the entities, as a gateway.

The method may further include transmitting a discovery response message in response to the discovery request message.

The discovery response message may include mode information that indicates that the first device operates in the combined mode.

According to another aspect of the present invention, there is provided a device. The device may include a storage unit for storing a CPNS enabled entity set to a gateway mode. The CPNS enabled entity set to the gateway mode may manage a first network, and one or more entities capable of receiving a first service through the CPNS enabled entity set to the gateway mode may be present in the first network.

The device may further include a transceiver for receiving a discovery request message including information about the mode of a second device from the second device. The discovery request message from the second device may be received when the device moves into the coverage of a second network managed by the second device.

The device may further include a processor for confirming whether one or more available PNEs are present in both coverages of the first network and the second network upon confirming that a CPNS enable entity of the second device is set to a gateway on the basis of the mode information, and determining whether to switch the mode of the CPNS enable entity of the first device on the basis of presence or absence of the one or more available PNEs and the mode of the second device, processor switching the mode of the CPNS enabled entity of the first device from the gateway mode to a combined mode according to the result of the determination.

Advantageous Effects

According to an embodiment of the present invention, the problem of the conventional technology can be solved. That is, the embodiment of the present invention provides a detailed technique to implement the CPNS.

BEST MODE

Figure 1:
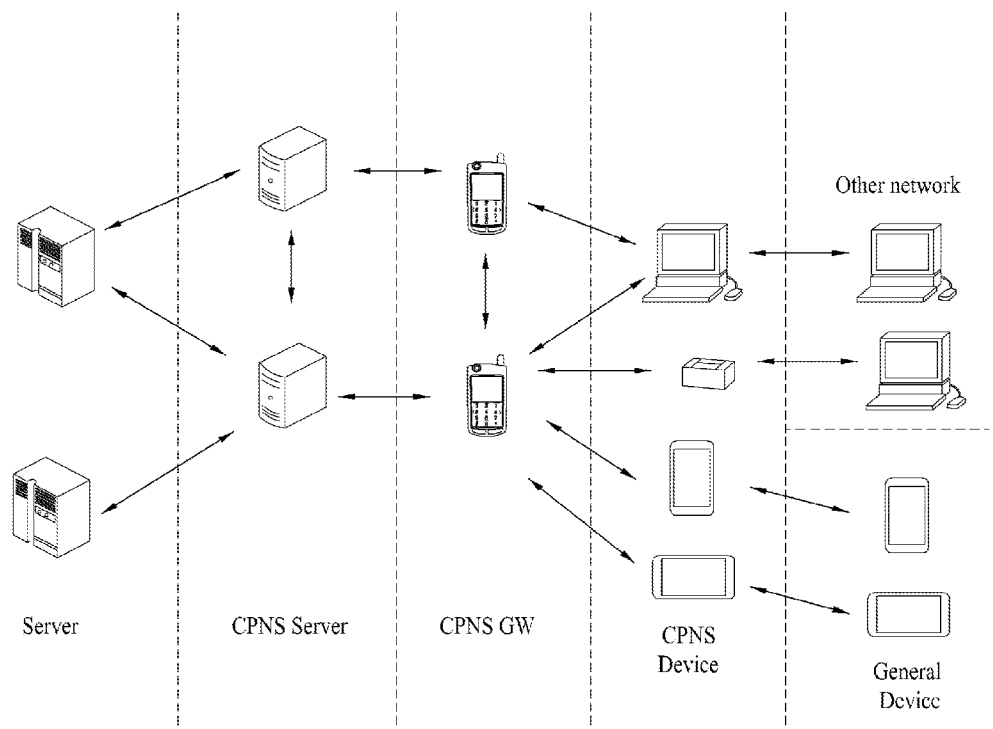
FIG. 1 illustrates the concept of the CPNS.

The present invention relates to a CPNS (Converged Personal Network Service). However, the present invention is not limited thereto and can be applied to any communication system and method and other systems to which the technical spirit of the present invention is applicable.

The terminology used in the description of the invention herein is for the purpose of describing particular embodiments only and is not intended to limit the invention. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in the description herein and throughout the claims that follow, "a", "an", and "the" includes plural references unless context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the meantime, although terms including an ordinal number, such as first or second, may be used to describe a variety of constituent elements, the constituent elements are not limited to the terms, and the terms are used only for the purpose of discriminating one constituent element from other constituent elements. For example, a first component can be called a second component and the second component can be called the first component without departing from the scope of the present invention.

When a component is "connected" or "coupled" to another component, although the component can be directly connected or coupled to the other component, another component may be interposed between the two components. When a component is "directly connected" or "directly coupled" to another component, it should be understood that another component is not interposed between the two components.

Reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may obscure the subject matter of the present invention. The preferred embodiments described in the specification and shown in the drawings are illustrative only and are not intended to represent all aspects of the invention, such that various equivalents and modifications can be made without departing from the spirit of the invention.

In the following, a terminal is shown in figures. The term 'terminal' may be replaced with the term 'user equipment (UE)', 'mobile equipment (ME)', 'mobile station (MS)', 'user terminal 'UT', 'subscriber station (SS)', 'wireless device', 'handheld device', 'smart phone', etc. In addition, the terminal may be a portable device having a communication function, such as a cellular phone, PDA, smartphone, wireless modem, notebook computer, etc. or a fixed device such as a vehicle mounted device.

Definition of Terminology

Prior to description with reference to the attached drawings, terms used in the specification are briefly defined in order to assist in understanding the present invention.

1) CPNS (Converted Personal Network Service): CPNS enables devices to belong to a PN (Personal Network) (or PAN (Personal Area Network)) to be provided with various services. While the tethering service is a technique of enabling a device connected to the Internet to allocate a private IP address to another device using NAT such that the other device can access the Internet using the private IP address, the CPNS enables a first device of a user to integrate and manage services that can be provided through a mobile communication network instead of simply allocating a private IP address to another device. Since the first device of the user integrates various services and manages the services, a plurality of devices of the user can share services thereof. For example, the user can use a video on demand through the first device and then ceaselessly transmit the video on demand to a second device. Accordingly, user convenience can be improved. Furthermore, when the user has a plurality of devices, an external server can determine a device to which the external server will transmit service data, from among the plurality of devices in order to transmit the service data to the user when the user does not request the service data. For example, if the user has a plurality of devices capable of performing video call, it is possible to determine a device to which a video call request will be transmitted from among the devices upon reception of the video call request. In addition, the video call can be transferred to another device of the user without cease. The CPNS is accomplished by a CPNS enabled entity included in a device of the user.

2) CPNS enabled entity: CPNS enabled entity is a logical entity. There are three types of CPNS enabled entities. That is, a PNE, a PN GW, and a CPNS server can exist. The CPNS server entity is located in a core network and the PNE and PN GW are located in a CPNS device.

3) CPNS device: This is a device capable of simultaneously operating in multiple modes in a personal network. The CPNS device has a function of processing, storing and playing content and can include a communication interface through which different CPNS devices can operate in different modes in a personal network.

4) CPNS server: This is a function entity capable of providing resources to CPNS entities at the request of the CPNS entities or in a push manner. The CPNS server registers devices and user related services, stores corresponding information, and provides registration of a PN corresponding to a group of devices and registration of a service group including a PN and a WAN. Furthermore, the CPNS server can communicate with external entities such as a content providing server. The CPNS server is an entity that sets a key for authenticating a device of a user in order to perform a service on a CPNS framework. Moreover, the CPNS server registers externally provided services and supports discover and use/provision requests such that devices can use the externally provided services.

5) Personal network (PN): This is a set of devices through which a user can use or generate a service. All devices in a PN can be connected to a PN GW. The PN can vary with time. The PN can include at least a device operating in a GW mode and a device operating as a PNE.

6) Personal Network Element (PNE): This constitutes a PN. The PNE can use or provide a service or content. The PNE is a subject that actually consumes content, applications and services. The PNE forms a PN and a service group in the CPNS framework.

7) Personal Network Gateway (PN GW): This is an entity in a PN and a wide area network and can generate a PN providing the CPNS. Furthermore, the PN GW connects heterogeneous networks for a device that cannot be connected to an external device and administrates registration and inventory of the CPNS server for connected devices while existing in the PN.

A PN GW included in a device enables not only a PNE present in a PN but also another device to be connected to the CPNS server. The PN GW in the device uses a global network such as a mobile network. In addition, the PN GW manages services with respect to PNEs, communication and function information.

8) PN inventory: This is a list of PNs, PNEs and devices which belong to a plurality of PNs.

9) Service group: This is a set of PNEs and PN GWs which share services, data and applications and refers to a group of devices registered in a server through a generated PN. Here, all devices that are members of the service group need not belong to one PN and include all devices that are located apart from one another because they belong to different PNs and thus cannot be connected to one another. In addition, the devices need not be devices owned by the same user.

10) Zone: This refers to a specific area.

11) Zone based service: This refers to a CPNS server provided in the coverage of a zone based PN GW.

12) Zone PN GW: This is a PN GW that provides a unique service or content in a zone.

13) CPNS enabled entity mode: A CPNS device can operate in PN GW and PNE modes. These modes can be confirmed among devices through a CPNS entity discovery function. A PN needs to include at least a device operating in the PN GW mode and a PNE operating in the PNE mode. A PNE and a PN GW need to know modes thereof each other in order to generate or participate in a PN. The PN GW needs to identify the PNE in order to generate a member of the PN. Furthermore, the PNE needs to newly generate a PN or to participate in a previously generated PN.

When there is a device (e.g. MP3 player, smart meter or the like) which supports only the PNE mode, the device needs to operate only in the PNE mode. If a certain device can operate only in the PN GW mode, this device operates in the PN GW mode. However, if a certain device can operate in one of the PN GW mode and the PNE mode, the mode of this device can be set according to a previously stored set value or be changed according to user setting or service provider setting.

Figure 2:
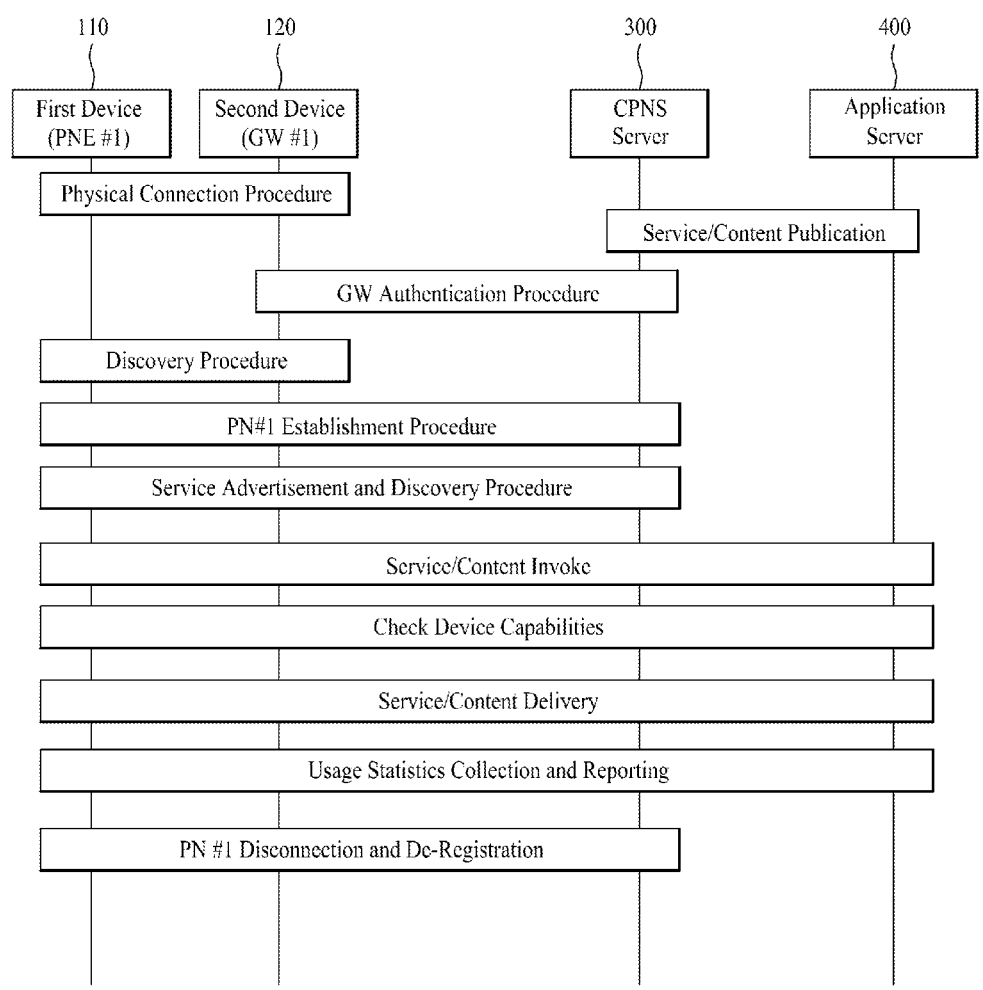
FIG. 2 illustrates a CPNS procedure.

FIG. 2 illustrates a CPNS procedure.

FIG. 2 shows a first device 110, a second device 120, a CPNS server 300, and an application server 400.

The first and second devices 110 and 120 are owned by a user A. The first device 110 is a cellular phone of the user A and may include a first transceiver through which the first device 100 can be connected to the CPNS server 300 via a mobile communication network. Furthermore, the first device 100 may include a second transceiver, such as Bluetooth, WiFi, ZigBee, etc., to form a personal network. The second device 120 is a portable multimedia device of the user A and may include only the second transceiver such as Bluetooth, WiFi, ZigBee, etc. to form the personal network without having the first transceiver capable of communicating with a mobile communication network.

The first and second devices 110 and 120 can respectively include CPNS enabled entities. Each CPNS enabled entity can operate in a gateway mode or a PNE (Personal Network Entity) mode. FIG. 2 shows that the CPNS enabled entities operate in the gateway mode since the second device 120 has the first transceiver that can be connected through the mobile communication network.

When the first device 110 and the second device 120 are located close to each other, the first and second devices 110 and 120 perform a physical connection procedure through the second transceivers thereof. The application server 400 registers services and content in the CPNS server 300 or advertises the services and content. The CPNS server 300 authenticates the second device 120 operating as a gateway.

Upon completion of the physical connection procedure of the first device 110 and the second device 120, the CPNS enabled entities of the first and second devices 110 and 120 discover each other.

Upon completion of discovery, the devices set up PN#1. Here, information about PN#1 is registered in the CPNS server 300.

When PN#1 has been set up, the CPNS server 300 advertises services registered therein to devices belonging to PN#1 or searches for services that can be provided by the devices included in PN#1.

When an arbitrary device belonging to PN#1 invokes an arbitrary service or content from among the advertised services, the function of the arbitrary device is checked and the service or content is transmitted according to the checked function.

When the arbitrary device uses the service or content, statistics about use of the service or content are collected and reported to the CPNS server 300 or the application server 400.

When PN#1 is not needed any more, PN#1 is cancelled and the information about PN#1, registered in the CPNS server 300, is also cancelled.

Figure 3:
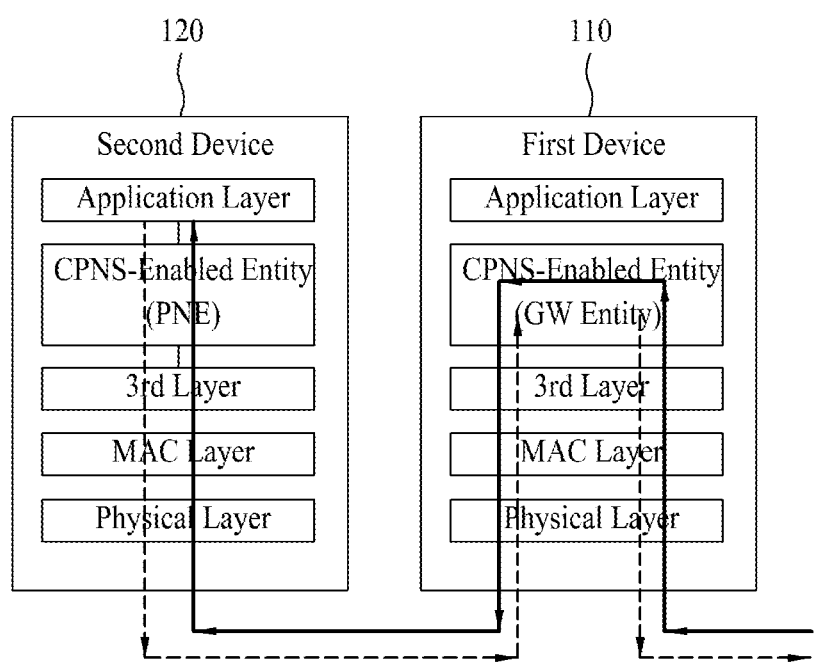
FIG. 3 illustrates architecture of first and second devices shown in FIG. 2.

FIG. 3 illustrates architecture of first and second devices shown in FIG. 2.

As shown in FIG. 3, each of the first and second devices 110 and 120 includes a physical layer, a MAC layer, a third layer, a CPNS enabled entity, and an application layer. The CPNS enabled entity of the second device 120 operates in the PNE mode and the CPNS enabled entity of the first device 110 operates only a gateway entity.

Accordingly, service data is transmitted to the gateway entity in the CPNS enabled entity of the first device 110 through the physical layer, MAC layer, and third layer of the first device 110, as indicated by a thick solid line in FIG. 3. When the gateway entity of the first device 110 receives the service data, the service data is transmitted to the second device 120 through the CPNS enabled entity, third layer, MAC layer and physical layer of the first device 110.

A PNE included in the CPNS enabled entity of the second device 120 receives the service data through the physical layer, MAC layer and third layer of the second device 120.

The PNE in the CPNS enabled entity of the second device 120 transmits a control message such as a request message or a response message to the first device 100 through the third layer, MAC layer and physical layer.

Figure 4:
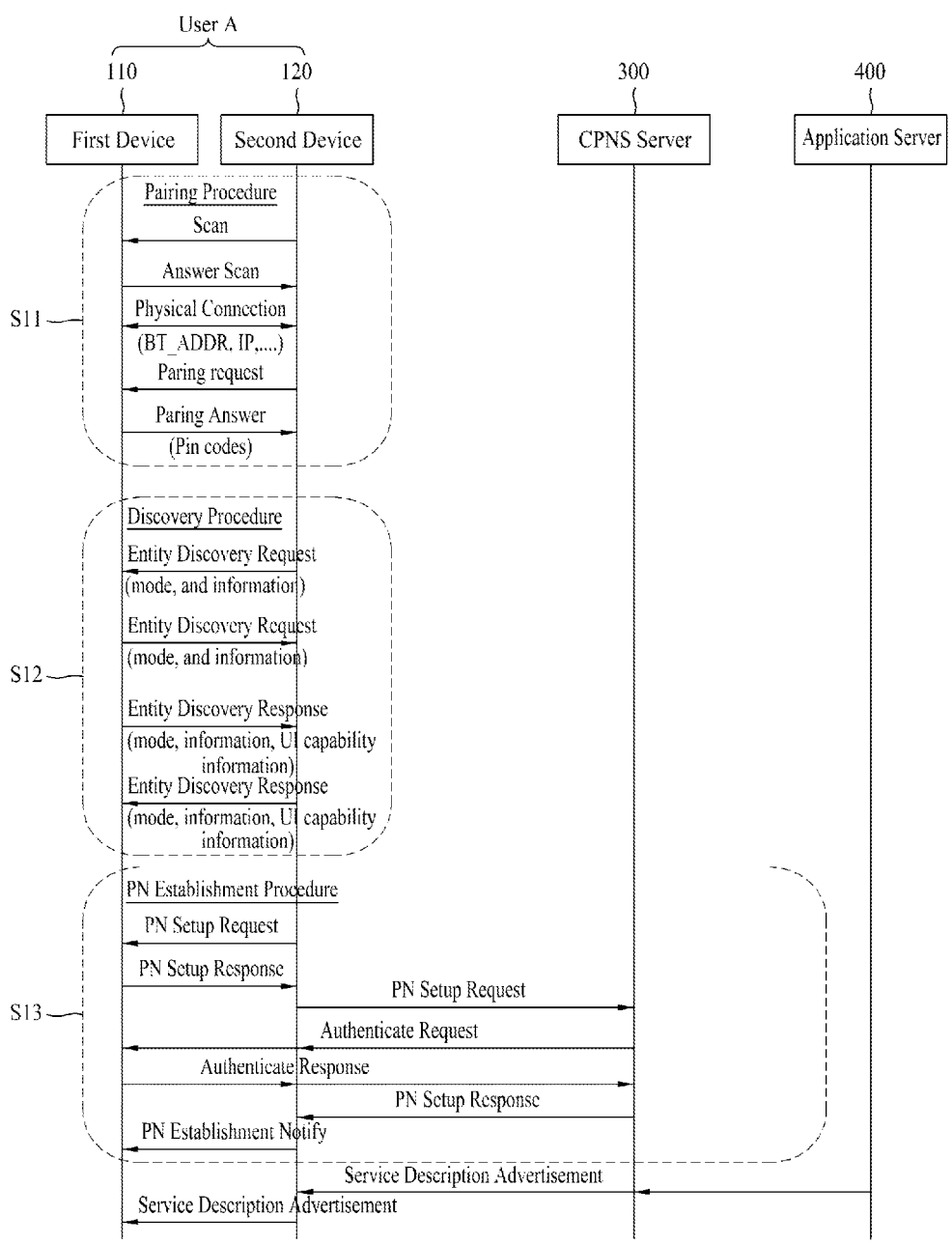
FIG. 4 illustrates a CPNS initial procedure.

FIG. 4 illustrates a CPNS initial procedure.

As shown in FIG. 4, a pairing process S11 corresponding to a physical connection procedure, an entity discovery process S12 and a PN establishment process S13 are performed.

In the pairing process S11, physical connection between devices of the user A is initiated.

To achieve this, the second device 120 starts to perform scanning. For scanning, the second device can transmit a scan message to the first device 110. The first device 110 transmits a scan answer message to the second device 120 to respond to the scan message. Then, physical connection between the first device and the second device is initiated and information for physical connection, e.g., addresses, IP addresses, etc. are exchanged. After information exchange, the second device transmits a physical connection request message, for example, a pairing request message to the first device. The first device receives a pin code from the user, embeds the pin code in a connection request answer message, for example, a pairing answer message, and transmits the pairing answer message including the pin code to the second device. If the pin code is correct, the physical connection procedure is completed.

Upon completion of physical connection, the CPNS enabled entities included in the devices discover each other, that is, perform the entity discovery process S12.

Specifically, the CPNS enabled entity of the second device 120 transmits a discovery request message, for example, entity discovery request message to the first device 110. The discovery request message, for example, the entity discovery request message includes information about the mode of the CPNS enabled entity included in the second device and information about the CPNS enabled entity and previously discovered other devices. If the CPNS enabled entity included in the second device is set to a gateway, the information about the mode of the CPNS enabled entity can include information representing the gateway.

The CPNS enabled entity included in the first device 100 also transmits a discovery request message, for example an entity discovery request message to the second device 120. The discovery request message, for example, the entity discovery request message includes information about the mode of the CPNS enabled entity included in the first device and information about the CPNS enabled entity and previously discovered other devices. If the CPNS enabled entity included in the first device is set to a PNE (Personal Network Entity), the information about the mode of the CPNS enabled entity can include information that represents the PNE.

The CPNS enabled entity of the first device 110 transmits a discovery response message, e.g., an entity discovery response message to the second device 120 in response to the discovery request message received from the second device. The discovery response message, e.g., the entity discovery response message includes mode information, information about the CPNS enabled entity and other previously discovered devices, and information about a UI function.

Similarly, the CPNS enabled entity of the second device 120 transmits a discovery response message, for example, an entity discovery response message to the first device 110 in response to the discovery request message received from the first device.

Upon completion of a discovery procedure using the above-mentioned signals, the PN establishment process S13 is performed.

Specifically, when the CPNS enabled entity of the second device 120 is set to a gateway, the second device 120 transmits a PN establishment request message, for example, a PN setup request message to a device set to a PNE, for example, the first device 110. Here, the PN setup request message may include information about the gateway and information about entities (e.g. the CPNS enabled entity included in the first device) that will belong to a PN to be generated.

When the CPNS enabled entity of the first device transmits a PN setup response message to the second device, the CPNS enabled entity of the second device 120 transmits the PN setup request message to the CPNS server 300.

Upon reception of the PN setup request message, the CPNS server 300 transmits an authentication request message to the first device through the second device 120 operating as a gateway. The first device transmits an authentication response message to the CPNS server 300 through the second device operating as a gateway in response to the authentication request message received from the CPNS server 300.

Upon reception of the authentication response message, the CPNS server 300 transmits the PN setup response message to the second device 120 operating as a gateway.

Then, the CPNS enabled entity of the second device 120 operating as a gateway transmits a PN establishment notification message to the first device.

When PN setup is completed according to transmission and reception of the above-mentioned messages, the application server 400 such as a content server can transmit a service description advertisement message including information about services of the application server 400 to the second device 120 corresponding to the gateway through the CPNS server 300. Then, the second device 120 corresponding to the gateway transmits the service description advertisement message to devices that belong to a PN managed by the second device 120.

Figure 5:
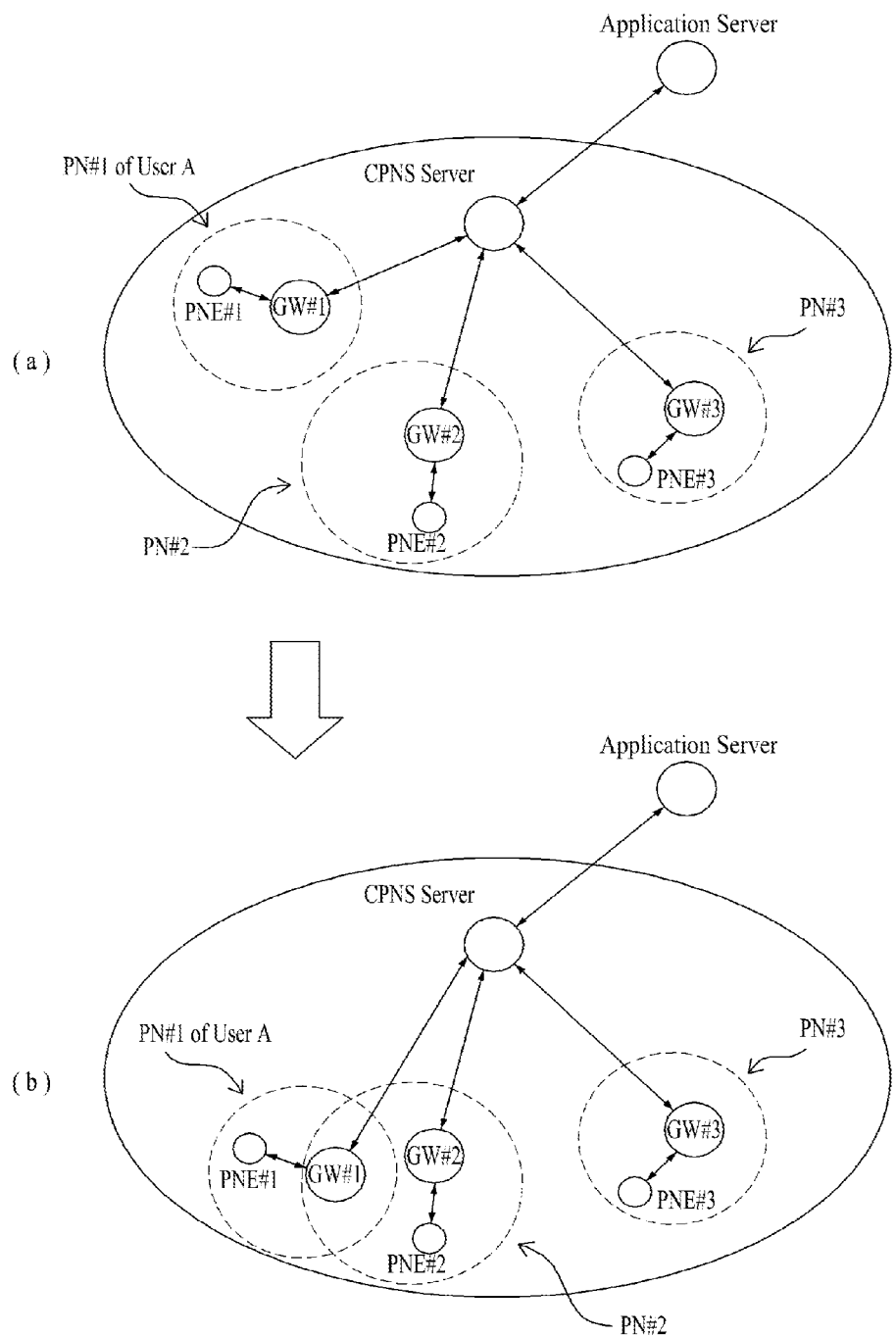
FIG. 5 illustrates an example of overlap of a PN of a user A with another PN due to movement of the user A.

FIG. 5 illustrates an example of overlap of a PN of the user A with another PN due to movement of the user A.

FIG. 5(*a*) shows three PNs, a CPNS server and an application server. PN#1 from among the three PNs is generated by the user A. PN#1 includes devices of the user A. For example, PN#1 can include GW#1 and PNE#1. It is assumed that GW#1 is a cellular phone of the user A and PNE#1 is a portable multimedia device of the user A. PN#2 includes GW#2 and PNE#2, and PN#3 includes GW#3 and PNE#3. The application server can provide services to the PNEs of the PNs through the CPNS server, GW#1, GW#2 and GW#3.

It is assumed that the user A moves into the coverage of PN#2 while carrying GW#1, as shown in FIG. 5(*b*).

Then, PN#1 including GW#1 overlaps with PN#2. That is, GW#1 and PNE#1 of the user A are within in the coverage of PN#2. Here, PNE#1 may move with the user A into the coverage of PN#2. However, while PNE#1 is within the coverage of PN#2, PNE#1 may not be connected with GW#2 included in PN#2 due to power shortage, power off, or a difference between communication schemes of PNE#1 and PN#2. Otherwise, if the user A carries only GW#1 leaving PNE#1 in a vehicle, PNE#1 may be located outside the coverage of PN#2.

When PNE#1 cannot be connected with GW#2 in PN#2 for the above-mentioned reason, the user A has no terminal through which a service can be received from GW#2 in PN#2.

Accordingly, GW#1 of the user A needs to operate as a PNE in order to receive the service since GW#1 is a gateway. A description will be given of processes for switching the mode of GW#1 from the gateway mode to other modes.

Figure 6:
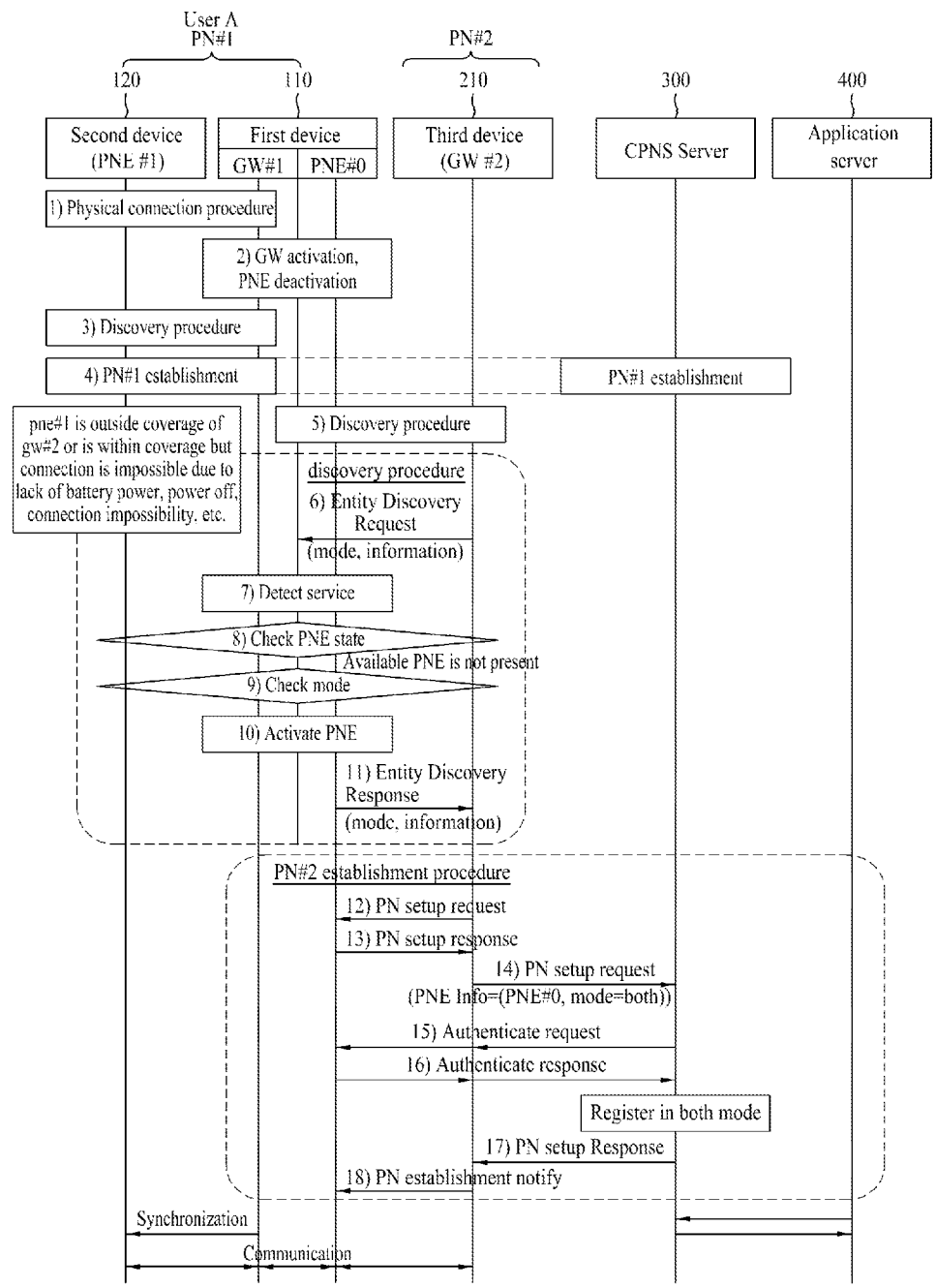
FIG. 6 shows a signal flow for switching a mode of a CPNS enabled entity.
Figure 7:
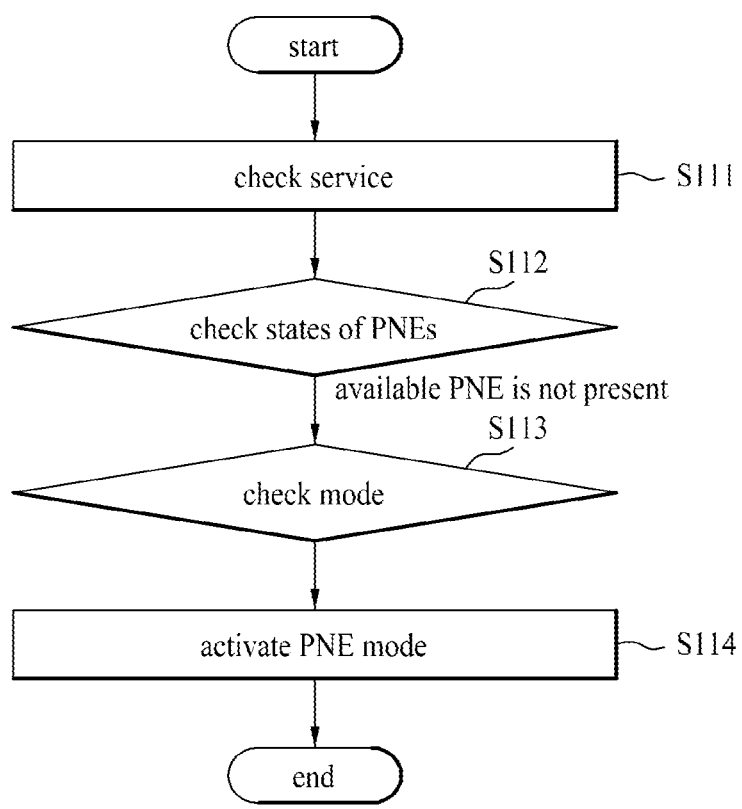
FIG. 7 is a flowchart illustrating a process of switching a mode of a CPNS enabled entity.

FIG. 6 shows a signal flow for switching a mode of a CPNS enabled entity and FIG. 7 is a flowchart illustrating a process of switching a mode of a CPNS enabled entity.

FIG. 6 illustrates a process of switching the mode of the CPNS enabled entity of the first device 120 from the gateway mode to other modes according to a first embodiment of the present invention.

Specifically, the user A has the first device 100 operating as a gateway and the second device 120 operating as a PNE, as shown in FIG. 6. It is assumed that the first device 110 is a cellular phone and the second device 120 is a portable multimedia device.

1) to 4) When the first device 110 and the second device 120 are located close to each other, a physical connection process is performed. The CPNS enabled entity included in the first device 110 reads a mode set value thereof, activates a gateway entity according to the mode set value and deactivates a PNE. Similarly, the CPNS enabled entity included in the second device 120 reads a mode set value thereof, activates a PNE according to the mode set value and deactivates a gateway entity. Subsequently, the first device 110 and the second device 120 discover each other. The CPNS enabled entity of the first device 110 performs a PN setup process to generate PN#1.

5) It is assumed that the user A moves into the coverage of PN#2 while carrying the first device 110. In this case, the second device may be located outside the coverage of PN#2 or may not communicate with PN#2 although it is located inside the coverage of PN#2 due to insufficient battery capacity, power off, a difference between communication schemes of the second device and PN#2, etc.

Then, the user A performs physical connection of the first device 110 and a third device 210.

6) Upon completion of physical connection, a CPNS enabled entity included in the third device 210 transmits a discovery request message when the mode thereof is set to the gateway mode. In this case, if the CPNS enabled entity included in the third device 210 and the CPNS enabled entity included in the first device 110 simultaneously transmit the discovery request message, information may overlap. To prevent this, the third device 210 operating as a gateway transmits the discovery request message first immediately after physical connection is completed.

The discovery request message may include the following elements.

EntityInfo element: This includes information about a CPNS enabled entity that transmits the discovery request message.

UserInfo element: This includes information about the user of the CPNS enabled entity that transmits the discovery request message. The information about the user may include a user ID and a user name as lower elements.

PNEID element (or attribute): This is the ID of a PNE when the CPNS enabled entity that transmits the discovery request message corresponds to the PNE.

PN GW ID element (or attribute): This is the ID of a PN GW when the CPNS enabled entity that transmits the discovery request message corresponds to the PN GW.

PNE name or PN GW name element: This is the name of a PNE when the CPNS enabled entity that transmits the discovery request message corresponds to the PNE, or the name of a PN GW when the CPNS enabled entity that transmits the discovery request message corresponds to the PN GW.

Mode element (or attribute): This is information about an activated mode of the CPNS enabled entity that transmits the discovery request message, which has a value indicating a PNE or a PN GW. This information has a value of 1 when the activated mode of the CPNS enabled entity corresponds to a PNE and has a value of 2 when the activated mode of the CPNS enabled entity corresponds to a PN GW. Since the CPNS enabled entity of the third device is set to a gateway in FIG. 6, the information includes a value of 2.

PN Info Req element (or attribute): This has a value of 'True' or 'False'. This element has the value 'True' when the CPNS enabled entity that transmits the discovery request message wants to acquire information about a PN, which is stored in an entity that will receive the discovery request message.

UI capabilities element (or attribute): This has a value 'True' when a PN GW instead of a PNE needs to perform user interaction. This element is set by a PNE. The element can be set to the value 'True' when the PN GW performs user interaction because the PNE has no user interface.

Zone based service support element (or attribute): This is set to 'True' when the PN GW can provide a zone based service.

PN Info element: This is included in the discovery request message when the CPNS enabled entity that transmits the discovery request message is a PN GW and includes a PN ID lower element, a PNE Info lower element, etc. The PN ID lower element represents the ID of a PN when the PN is previously present and the PNE Info lower element includes information about a PNE belonging to a PN when the PN is previously present. The PNE Info lower element includes a PNE ID element and a PNE name element.

After generation of the discovery request message, the gateway transmits the discovery request message to discovered devices through physical connection. The discovery request message can be transmitted in a broadcast manner.

The discovery request message may have a configuration shown in Table 1.

TABLE 1

| Element | | Description |
|---|---|---|
| UserInfo | | This includes UserID and UserName. |
| | User ID | ID of CPNS user |
| | UserName | CPNS user name |
| Entity Info | | This is an abbreviation for Entity information. |
| | | This can include the following lower elements. |
| | | PNEID, PNGWID, Name, Mode, PN Info Req, UI Capa, Zone based service support, Broadcast group key delivery support |
| | PNEID | ID of a PNE |
| | PNGWID | ID of a PN GW |
| | Name | Name of the PNE or PN GW |
| | Mode | Mode of a transmission subject. This is 1 when the PNE is a transmission subject and 2 when the PN GW is a transmission subject. This is 3 when a transmission subject can operate as the PNE and GW simultaneously. |
| | PNInfoReq | This is set to 'True' when PN Info is requested when the PNE transmits the message. |
| | UICapa | This is set to 'True' when the PN GW interacts with the user since a device operating as a PNE has no user interface. |
| | Zone based service support | This is set to 'True' when the PN GW provides a zone based service. |
| PN Info | | This includes information about a PN such that a PNE joins the PN when a PN GW transmits the discovery request message and has the PN. |
| | | This can include PN ID, Description, and PNE Info lower element. |
| | PNID | ID of a PN |
| | Description | Description about the PN |
| | PNE Info | This includes information about PNEs that are members of the PN. This can include PNEID and PNE name as lower elements. Furthermore, this can include Device Info as a lower element. |

TABLE 1-continued

| Element | Description | | |
|---|---|---|---|
| | PNEID | ID of a PNE | |
| | PNEName | Name of the PNE | |
| | Device Info | This is information about a device. This can include a Mode element and InactiveMode. | |
| | | Mode | This can include information about a currently activated mode. |
| | | Inactive Mode | This includes information about an inactivated mode. |

As shown in FIG. 7, the CPNS enabled entity of the first device 110 confirms a provided service by checking an element about the service, for example, 'zone based service support' in the received discovery request message (S111). When the provided service is one desired by the user A, the next process is performed.

The CPNS enabled entity of the first device 110 checks the mode of a counterparty that has transmitted the discovery request message through the mode element on the basis of the received discovery request message and checks the ID of the counterparty through the EntityInfo element.

8) and 9) The CPNS enabled entity of the first device 110 checks states of PNEs that belong to PN#1 (S112). When there is no PNE that can use the service provided by PN#2, the CPNS enabled entity of the first device 110 checks the mode thereof (S113). The fact that there is no PNE capable of using the service provided by PN#2 may mean that none of PNEs located in the coverage of PN#1 is located in the coverage of PN#2, or mean that there is no PNE capable of communicating with PN#2 due to insufficient battery capacity, power off, communication scheme difference, etc. although one or more PNEs are located in both the coverage of PN#1 and the coverage of PN#2.

Whether there is a PNE that can use the service provided by PN#2 can be determined with reference to the following table 2.

TABLE 2

| Presence in overlap area of coverage of PN#1 and coverage of PN#2 | Presence inside coverage of PN#1 but outside coverage of PN#2 | Determination result |
|---|---|---|
| Available PNE is present. | PNE is present. | Mode switch is required. |
| Available PNE is present. | PNE is not present. | Mode switch is not required. |
| Available PNE is not present. | PNE is present. | Mode switch is required. |
| Available PNE is not present. | PNE is not present. | Mode switch is not required. |

10) When the CPNS enabled entity of the first device 10 can operate as a PNE as well as a gateway, the PNE is activated (S114). Upon activation of the PNE, both the gateway mode and the PNE mode are activated. Simultaneous activation of the two modes is called a 'both mode' or 'combined mode'.

11) When the checked mode of the counterparty is the GW mode, it is determined that an additional discovery request message is not transmitted, and a discovery response message is generated.

Here, when the CPNS enabled entity of the first device 110 activates the PNE as well as the gateway, mode information included in the discovery response message, for example, entity discovery response message in response to the discovery request message is set to 'both mode' or 'combined mode' and transmitted.

Entity Info element: Information about a CPNS enabled entity that receives the discovery request message, which includes a User ID and a user name as lower elements.

PNE ID element: This includes the ID of a PNE when the CPNS enabled entity that receives the discovery request message is the PNE.

PNE Name element: This includes the name of a PNE when the CPNS enabled entity that receives the discovery request message is the PNE.

Mode element: This is set to 'both mode' or 'combined mode'.

UI Capa element: This has a value 'True' when a PN GW instead of a PNE performs user interaction. This is set by the PNE. For example, this element can be set to a value 'True' when the PN GW interacts with the user since the PNE has no user interface.

PN Info element: This element is included in the discovery response message when the PN Info Req element has been set to 'True' in the received discovery request message. The first device 110 includes information about PN#1 generated by the first and second devices 110 and 120 in this element when the PN Info Req element has been set to 'True' in the received discovery request message. The PN Info element can include a PN ID, description, etc. as lower elements.

PNE Info element: This element includes information about members of a PN.

The above-described discovery response message may have a configuration shown in the following table 3.

TABLE 3

| Element | Description | |
|---|---|---|
| UserInfo | This includes UserID and UserName | |
| | User ID | ID of a user |
| | UserName | Name of the user |
| Entity Info | This is an abbreviation for entity information. This can include the following lower elements. | |

TABLE 3-continued

| Element | Description |
|---|---|
| | PNEID, PNGWID, Name, Mode, PN Info Req, UI Capa |
| | PNEID — ID of a PNE |
| | PNGWID — ID of a PN GW |
| | Name — Name of the PNE or PN GW |
| | Mode — Mode of a subject that transmits a discovery response message. This is 1 when the PNE transmits the discovery response message and is 2 when the PN GW transmits the discovery response message. This is 3 when the PNE and GW can simultaneously operate. |
| | UICapa — This is set to 'True' when the PN GW interacts with the user since a device operating as the PNE has no user interface. |
| PN Info | This includes information about a PN when the PNE transmits the discovery response message and has joined another PN. This can include PN ID, Description, and PNE Info as lower elements. |
| | PNID — ID of a PN |
| | Description — Description about the PN |
| | PNE Info — This includes information about PNEs that are members of the PN. This can include PNEID and PNE name as lower elements. Furthermore, this can include Device Info as a lower element. |
| |     PNEID — ID of a PNE |
| |     PNEName — Name of the PNE |
| |     Device Info — This is information about a device. This can include a Mode element and InactiveMode element. |
| |     Mode — This can include information about a currently activated mode. |
| |     InactiveMode — This includes information about an inactivated mode. |

Upon checking that the CPNS enabled entity of the first device 110 operates in the 'both mode' or 'combined mode' in which the CPNS enabled entity operates as a PNE as well as a gateway, the third device 210 starts a PN#2 setup process through which the first device 110 joins PN#2 to which the third device 210 belongs. This is described in more detail below.

12) The CPNS enabled entity of the third device 210 transmits a PN setup request message to the first device 110. Here, the PN setup request message may include information about the gateway and information about entities (e.g. CPNS enabled entity included in the first device) that will belong to a PN to be generated.

The PN setup request message may have a configuration shown in Table 4.

TABLE 4

| Element | Description |
|---|---|
| Origin Entity ID | ID of a CPNS entity for which a PN will be set up |
| PN Setup Type | This represents how the PN is set up. 1: PN GW and PNE one-to-on correspond to each other and are included in the PN. 2: PNE sets up the PN with all devices connected to PN GWs. 3: PN is set up only with invited specific PNEs. |
| Invited PNE ID | This includes IDs of PNEs that will be invited during PN setup process. |
| PN Info | This is information about a PN that will be registered and stored in a CPNS server and can include the following elements. PNID, Description, Disclosure, Ownership Entity, PN GW Info, PNE Info |
| | PN ID — This represents ID of a PN. |
| | Description — This represents description of the PN (e.g. home, office). |
| | PN GW Info — This is information about a PN GW and includes PNGWID and PN GW Name elements. |
| |     PNGWID — ID of a PN GW |
| |     PN GW Name — Name of the PN GW |
| | PNE Info — This is information about a PNE and can include PNEID, PNE Name, Mode, Description, Device Capa, and Service profile elements. |
| |     PNE ID — ID of a PNE |
| |     PNE Name — Name of the PNE |
| |     Mode — Information about the mode of the PNE |
| |     Description — Description of the PN |
| |     Device Capa — Information about functions of a device including a PNE |

TABLE 4-continued

| Element | Description | | |
|---|---|---|---|
| | | Service Profile | Information about CPNS enabled applications or information about content supporting a specific service or status |
| Auth IniData | This is information used to start PNE authentication and can include AuthPNEID, rand_PNE, LocalEUKeyAssignment. | | |
| | AuthPNEID | | ID of a target PNE that needs to be authenticated by the CPNS server |
| | Rand_PNE | | Random value generated by a PNE |
| | LocalEUKeyAssignment | | Flag representing necessity of LocalEUKey assignment TRUE: necessary, FALSE: unnecessary |

13) When the CPNS enabled entity operating as a PNE in the first device 110 receives the PN setup request message, the PNE checks the Origin Entity ID element in order to find out the entity that attempts to generate the PN. Then, the PNE extracts PN ID and Msg ID elements from the PN setup request message.

The CPNS enabled entity operating as the PNE in the first device 110 generates a PN setup response message as follows.

The CPNS enabled entity operating as the PNE includes a response to the PN setup request message in a Return element included in the PN setup response message. The response is '1' when the CPNS enabled entity can process the PN setup request and '2' when the CPNS enabled entity cannot process the PN setup request. Subsequently, PN Info element about PN information stored in the CPNS enabled entity of the first device 110 is included in the PN setup response message. Then, information about a PNE that belongs to the PN, which is stored in the CPNS enabled entity of the first device 110, is included in a PNE Info element in the PN setup response message. In addition, various elements are included in the PN setup response message.

The message generated in this manner may have a configuration shown in Table 5.

TABLE 5

| Element | Description | | |
|---|---|---|---|
| Return | This represents whether PN setup request is successfully processed. 1: OK 2: Fail, CPNS enabled entity cannot process PN setup request 3: Not permitted | | |
| PN Info | This is information about a PN and can include PNID, Description, PNGWInfo, and PNEInfo. | | |
| | PN ID | | ID of a PN |
| | Description | | Description of the PN |
| | PN GW Info | | This is information about a PN GW and includes PNGWID and PN GW Name elements. |
| | PNGWID | | ID of a PN GW |
| | PNGW Name | | Name of the PN GW |
| | PNE Info | | This is information about a PNE and can include PNEID, PNEName, Mode, Description, DeviceCapa, and Serviceprofile. |
| | | PNEID | ID of a PNE |
| | | PNEName | Name of the PNE |
| | | Mode | Information about the mode of the PNE |
| | | Description | Description of PN |
| | | Device Capa | Information about functions of a device including a PNE |
| | | Service Profile | Information about CPNS enabled applications or information about content supporting a specific service or status |
| Auth IniData | This is information use to start PNE authentication and can include AuthPNEID, rand PNE, LocalEUKeyAssignment. | | |
| | AuthPNEID | | ID of a target PNE that needs to be authenticated by the CPNS server |
| | Rand PNE | | Random value generated by a PNE |
| | LocalEUKeyAssignment | | Flag representing necessity of LocalEUKey assignment TRUE: necessary, FALSE: unnecessary |
| | Auth FinData | | This is information used for a PNE to authenticate a CPNS server and includes HASH. |
| | HASH | | Hash value calculated by a target PNE or PN GW. |

Upon generation of the PN setup response message, the CPNS enabled entity of the first device transmits the generated message to the third device 120.

14) When the CPNS enabled entity of the third device 210 receives the PN setup response message, the CPNS enabled entity of the third device 210 checks the Return element included in the received message in order to check whether the first device wants to join the PN. When the Return element is set to '1', the CPNS enabled entity of the third device 210 generates information about a PN inventory for the PN, creates a routing table on the basis of information from the received message and maintains the routing table.

The CPNS enabled entity of the third device 210 generates a PN setup request message to be transmitted to the CPNS server.

Specifically, the CPNS enabled entity of the third device 210 embeds the ID of the PN GW in an OriginEntityID element. The CPNS enabled entity of the third device 210 includes information about the PN to be generated in a PN Info element of the PN setup request message. Here, the PN Info element includes a PN ID element including the ID of the PN generated by the PN GW, Description element including description of the PN, etc. In addition, the CPNS enabled entity of the third device 210 embeds a PN GW Info element in the PN setup request message. Here, the PN GW Info element includes a PN GW ID element that represents the ID of the PN GW and PN GW Name element that represents the name of the PN GW. Furthermore, the CPNS enabled entity of the third device 210 includes a PNE Info element and an Auth Ini Data element in the PN setup request message.

Particularly, the CPNS enabled entity of the third device 210 includes a value representing that the first device 110 operates in the 'both mode' or 'combined mode' in a lower Mode element of the PNE Info element. That is, the PNE ID is set to PNE#0 and Mode is set to 'Both' in the PNE Info element, as shown in FIG. 6.

Upon generation of the PN setup request message, the CPNS enabled entity of the third device 210 transmits the generated PN setup request message to the CPNS server 300.

15) Upon reception of the PN setup request message from the third device 210, the CPNS server 300 generates an authentication request message and transmits the authentication request message to the first device 110 through the third device 210.

16) The first device 110 transmits an authentication response message to the CPNS server 300 through the third device 210.

When authentication is successful from the result of checking the authentication response message, the CPNS server 300 registers PN information included in the PN setup request message and stores the PN information in the PN inventory.

17) The CPNS server 300 generates a PN setup response message and transmits the PN setup response message to the third device 210.

18) Upon reception of the PN setup response message from the CPNS server 300, the third device 210 stores the PN information in a local PN inventory. The third device 210 generates a PN establishment notification message and transmits the PN establishment notification message to the first device 110.

When PN#2 has been set up through the above procedure, the application server 400 can acquire information about PN#2 from the CPNS server 300 and, when service data is present, determine the first device 110 or the second device 120 as a destination of the service data through the acquired information. When the application server 400 determines the second device 120 as the destination of the service data, the application server 400 transmits the service data to the third device operating as a gateway and the third device 210 delivers the service data to the first device 110 operating as a PNE. When the CPNS enabled entity operating as a PNE in the first device 110 receives the service data, the CPNS enabled entity transmits the service data to an interval gateway and the internal gateway delivers the service data to the second device 120.

Figure 8:
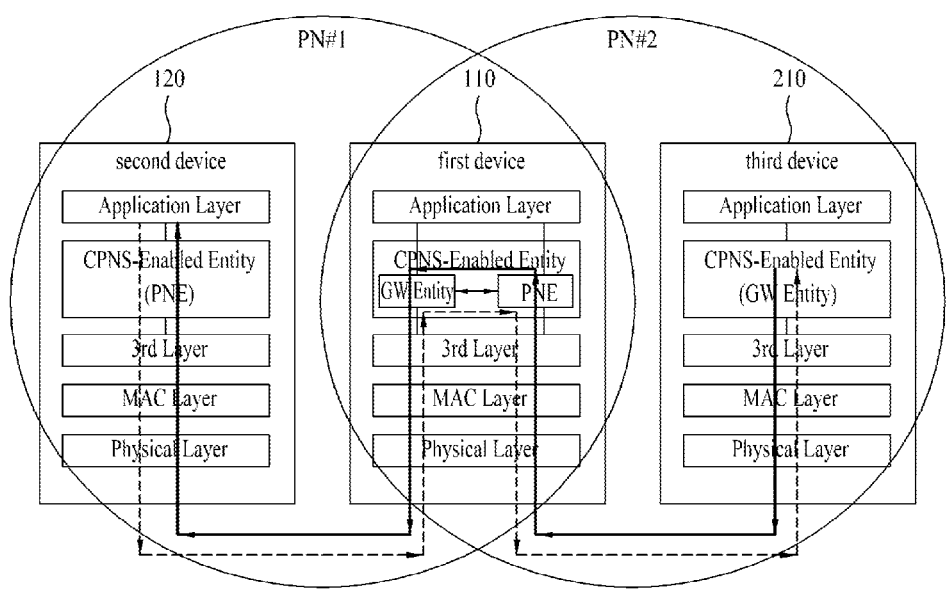
FIG. 8 illustrates architecture after mode change.

When the CPNS enabled entity of the first device 110 operates in 'Both mode', the gateway and PNE simultaneously operate in the CPNS enabled entity of the first device 110 and a communication channel is set up between the gateway and the PNE, as illustrated in FIG. 8. Accordingly, the CPNS enabled entity of the first device 110 receives the service data from the third device 210, which operates as a gateway in PN#2, as a PNE. The CPNS enabled entity of the first device 110 delivers the service data to the second device 120, which operates as a PNE in PN#2, as a gateway.

More specifically, as shown in FIG. 8, the physical layer, MAC layer, third layer, CPNS enabled entity and application layer are present in each of the first, second and third devices 110, 120 and 210. The CPNS enabled entity of the second device 120 drives only the PNE and the CPNS enabled entity of the third device 210 drives only the a gateway entity. The CPNS enabled entity of the first device 110 drives both the PNE and gateway when the first device 110 is switched to 'both mode' or 'combined mode'. Furthermore, a communication link is established between the PNE and the gateway entity in the CPNS enabled entity of the first device 110 as shown in FIG. 8.

Accordingly, service data is transmitted to the first device 110 through the CPNS enabled entity, third layer, MAC layer and physical layer of the third device 210. When the first device 110 receives the service data, the PNE of the CPNS enabled entity of the first device 110 receives the service data through the physical layer, MAC layer and third layer of the first device 110 and delivers the service data to the gateway entity through the communication link established between the PNE and the gateway entity. The gateway entity in the CPNS enabled entity of the first device 110 transmits the service data to the second device 120 through the third layer, MAC layer and physical layer of the first device 110.

When the CPNS enabled entity included in the first device 110 communicates as a PNE with the third device 210 operating as a gateway and, at the same time, communicates as a gateway with the second device 120 operating as a PNE, synchronization needs to be adjusted.

In other words, if synchronization is not achieved when the CPNS enabled entity of the first device 110 simultaneously communicates with the third device 210 and the second device 120, communication with one device may act as interference in communication with the other device. For example, a signal transmitted from the third device 210 to the first device 110 may become interference in the second device 120. Similarly, a signal transmitted from the second device 120 to the first device 110 may act as interference in the third device 120.

To avoid this interference, synchronization of the communication link between the first device 110 and the second device 120 needs to be readjusted according to synchronization of the communication link between the third device 210 and the first device 110.

This is described in detail with reference to FIGS. 9 and 10.

Figure 9:
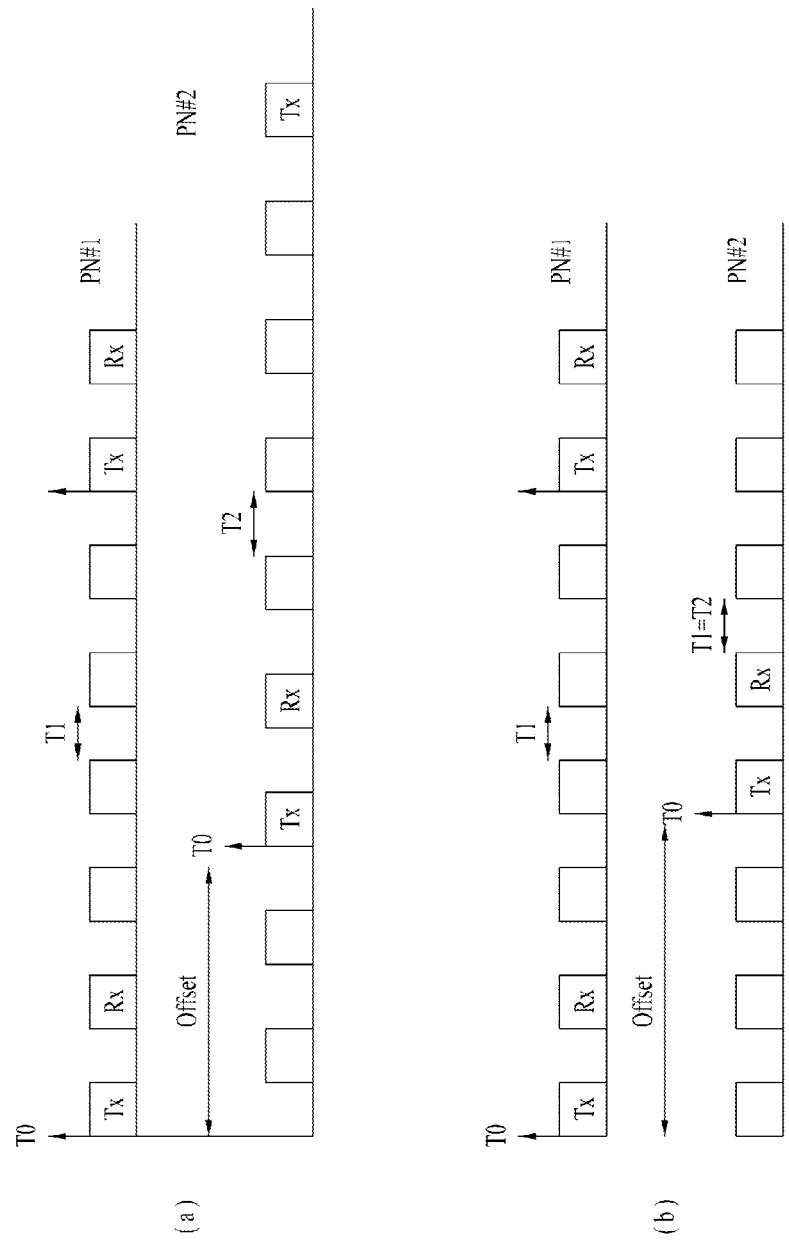
FIG. 9 illustrates an example of controlling synchronization after a mode of a CPS enabled entity switches.

FIG. 9 illustrates an example of adjusting synchronization after the mode of a CPS enabled entity switches.

The upper part of FIG. 9($a$) shows transmission (Tx) and reception (Rx) cycles in PN#1 composed of the first device 110 and the second device 120, and the lower part of FIG. 9($a$) shows transmission (Tx) and reception (Rx) cycles in PN#2 composed of the first device 110 and the third device 210. As shown in FIG. 9($a$), an idle time T1 in PN#1 may be longer than an idle time T2 in PN#2.

Accordingly, a signal transmitted from the third device 210 to the first device 110 in PN#2 may interfere with the second device 120 in PN#1.

To solve the above-mentioned desynchronization, the first device 110 can measure a start point T0 in the link between the first device 110 and the third device 210. Furthermore, the first device 110 can measure one of more of Tx cycle, Rx cycle and idle time between Tx and Rx with respect to the third device 210.

The first device 110 can transmit a control signal for adjusting synchronization with the second device 120 to the second device on the basis of one or more of the measurement results. Here, the control signal can include one or more of the measurement results.

The second device 120 can readjust synchronization with the first device 110 on the basis of the control signal.

Upon readjustment of synchronization, the idle time T1 and the idle time T2 can be equal to each other, as shown in FIG. 9(*b*). Furthermore, Tx cycles can correspond to each other and Rx cycles can correspond to each other.

Figure 10:
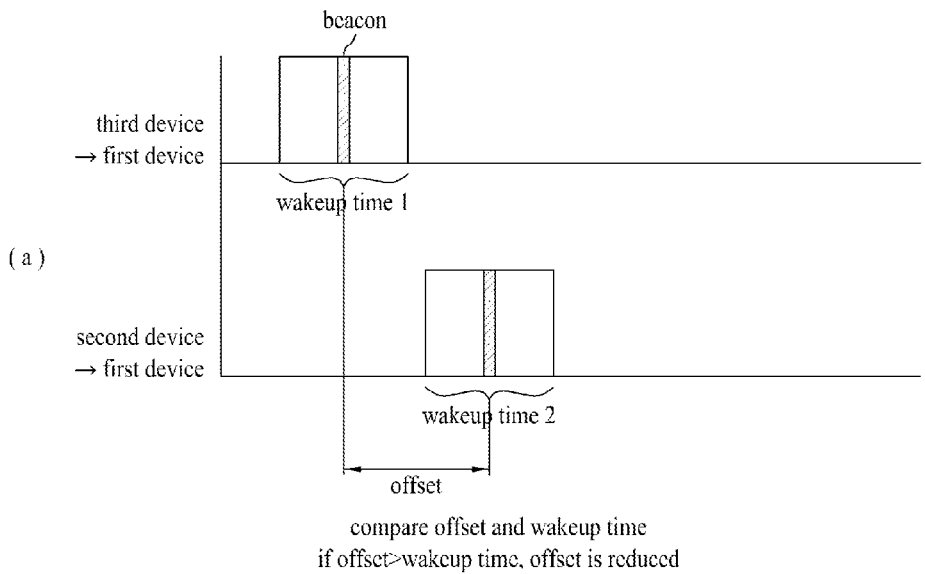
FIG. 10 illustrates another example of controlling synchronization after a mode of a CPS enabled entity switches.
Figure 10:
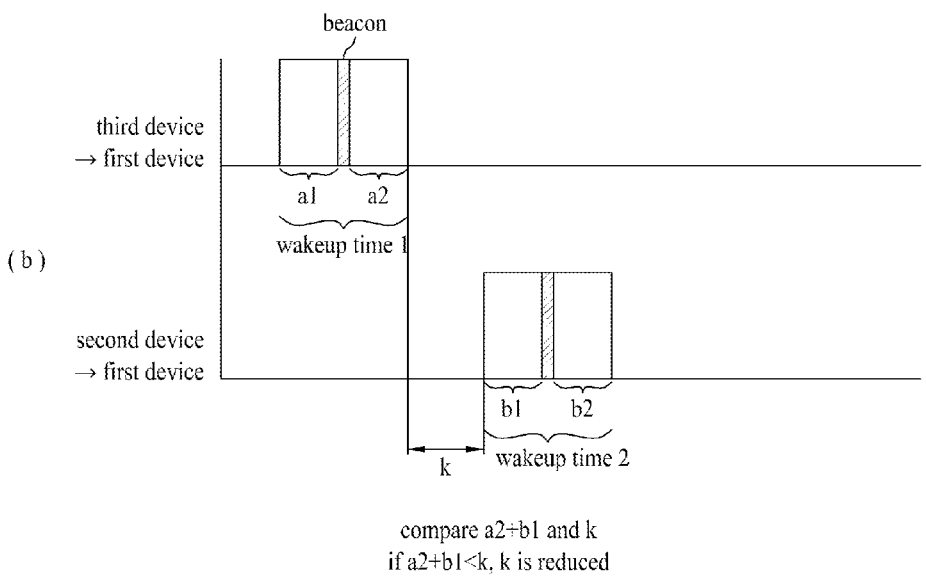

FIG. 10 illustrates another example of adjusting synchronization after the mode of a CPS enabled entity switches.

The upper part of FIG. 10(*a*) shows an operation of the first device 110 to receive data from the third device 210 and the lower part thereof shows an operation of the first device 110 to receive data from the second device 120. In FIG. 10(*a*), a time during which the first device 110 applies power to an internal receiver thereof in order to receive a beacon signal from the third device 210 is represented as 'wakeup time 1' and a time during which the first device 110 supplies power to the internal receiver thereof in order to receive a beacon signal from the second device 120 is represented as 'wakeup time 2'.

As shown in FIG. 10(*a*), the first device 110 needs to apply power to the receiver for wakeup time 1 and wakeup time 2 in order to receive the beacon signals.

Accordingly, power can be used more efficiently if it is possible to reduce the time for which power is applied to the received.

To achieve this, the first device 110 compares an offset between the time when the beacon signal is received from the third device 210 and the time when the beacon signal is received from the second device 210 with the wakeup time 1. If the offset is longer than the wakeup time 1, the offset can be reduced. To decrease the offset, the first device 110 can transmit a control signal to the second device 120.

Referring to FIG. 10(*b*), it is assumed that a time during which the first device 110 applies power to the internal receiver thereof in order to receive a beacon signal from the third device 210 is wakeup time 1, a time before the beacon signal is received in the wakeup time 1 is a time a1, and a time after the beacon signal is received in the wakeup time 1 is a time a2. In addition, it is assumed that a time during which the first device 110 applies power to the internal receiver thereof in order to receive a beacon signal from the second device 120 is wakeup time 2, a time before the beacon signal is received in the wakeup time 2 is a time b1, a time after the beacon signal is received in the wakeup time 2 is a time b2, and a time offset between the wakeup time 1 and wakeup time 2 is k.

The first device 110 compares a2+b1 with k. If a2+b1<k, the first device 110 decreases k. To decrease k, the first device 110 can transmit a control signal to the second device 120.

Figure 11:
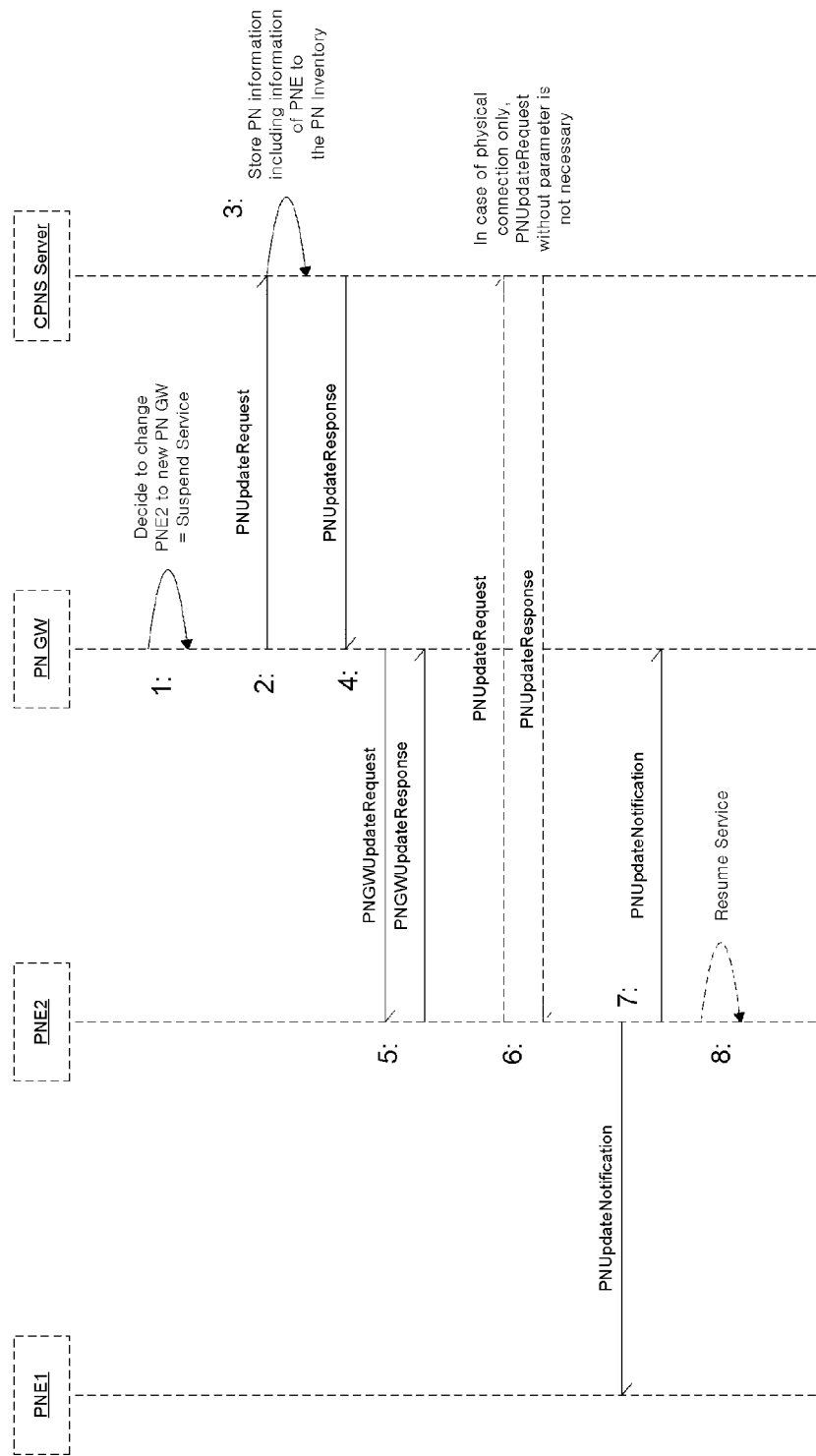
FIG. 11 illustrates an example of a mode switching flow for changing another PNE to the PN GW by the current PN GW and lowering the PN GW to the PNE.

FIG. 11 shows a mode switching flow for changing another PNE to the PN GW by the current PN GW and lowering the PN GW to the PNE. Among the CPNS entities, the modes of the PNE and the PN GW may be changed and the above flow shows the case in which the mode of the PNE is changed by the intention of the PN GW.

The current PN GW performs mode switching to the PNE and selects one of other PNEs having the PN GW function and performs mode switching of the selected PNE to the PN GW. At this time, second PN GW priority may be stored as highest priority.

1. The PN GW determines that the PNE2 is changed to the PN GW. This means that the user sets another PNE as the PN GW using a program of AP or a mobile phone. At this time, if the current PN GW performs a specific content service, the service is temporally stopped and is resumed after the PN GW is set to the PNE2 again.

2. The PN GW changes the mode of the existing PN GW to PNE and changes the mode of a newly changed PNE2 to the PN GW in the parameter of PNUdateRequest. At this time, the PN GW may include PN GW Auth Info or Creator (User) Info in the PNUpdateRequest message in order to inform that the PN GW has rights for PN update. In addition, the PN GW may set and transmit high Second PN GW Priority and correct and transmit the Second PN GW Priority of other PNEs excluding the PNE2 in the PN inventory as necessary.

3. The CPNS Server corrects the PN inventory based on the received information, assigns the PN GW function to the PNE2 and recognizes the PNE2 as the PH having a new data path.

4. The CPNS Server includes second PN GW priority of PNE items in the PN inventory and changed information such as TTL/heartbeat of PN items in the PNUpdateResponse message and transmits it to PN GW as necessary.

5. The PN GW transmits a PNGWUpdateRequest message for handing over the role of the PN GW to the PNE2. This message includes PN inventory information currently stored in the PN GW in order to enable the PNE2 to serve as the PN GW. The PNE2 stores all the received content and transmits PNGWUpdateResponse.

6. The PNE2 newly becomes the PN GW and attempts physical connection with the CPNS server in order to set the data path of the current PN by including a PNID and transmitting a PNUpdateRequest message including additional information or attempts physical connection without message transmission.

7. The PNE2 transmits information indicating the PNE2 becomes the new PN GW to other PNEs in the PN using PNUpdateNotification by referring to the information in the PN inventory. The low-level parameters are equal to the procedure of FIG. 6.

8. The PNE2 resumes the service which was previously stopped.

Figure 12:
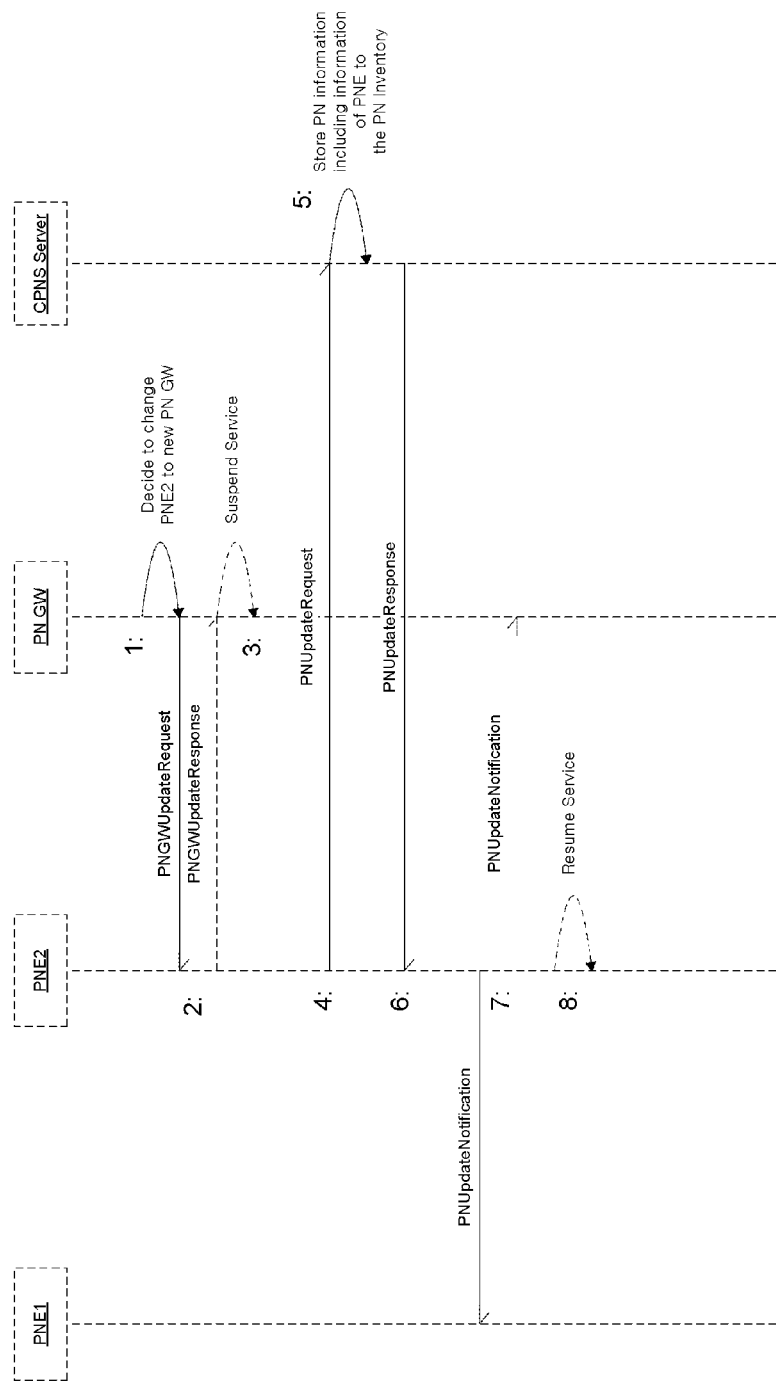
FIGS. 12 and 13 illustrate examples of modified flows of FIG. 11.
Figure 13:
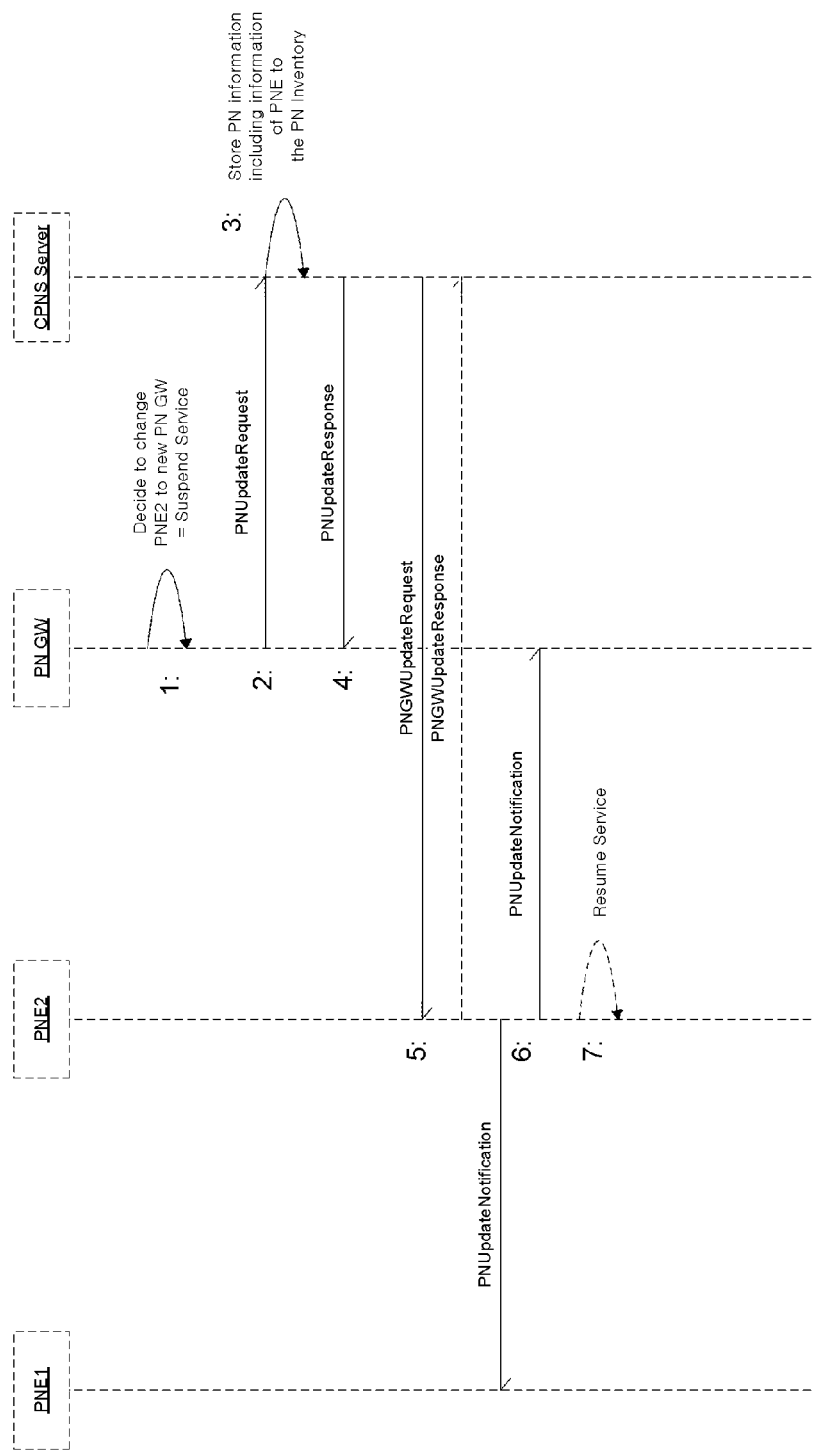

FIGS. 12 and 13 show modified flows of FIG. 11. After the PN GW determines mode switching, In PN GW switching of FIG. 11, the PN GW directly informs the CPNS server of PN update and informs the PNE2 which is a new PN GW of PN GW change, In PN GW switching 2 of FIG. 12, the PNE2 is enabled to perform operation associated with mode switching and the PNE2 performs PN update with respect to the CPNS server, In PN GW switching 3 of FIG. 13, the PN GW informs the CPNS server of PN update and the CPNS server informs the PNE2 which is a new PN GW of PN GW change.

Figure 14:
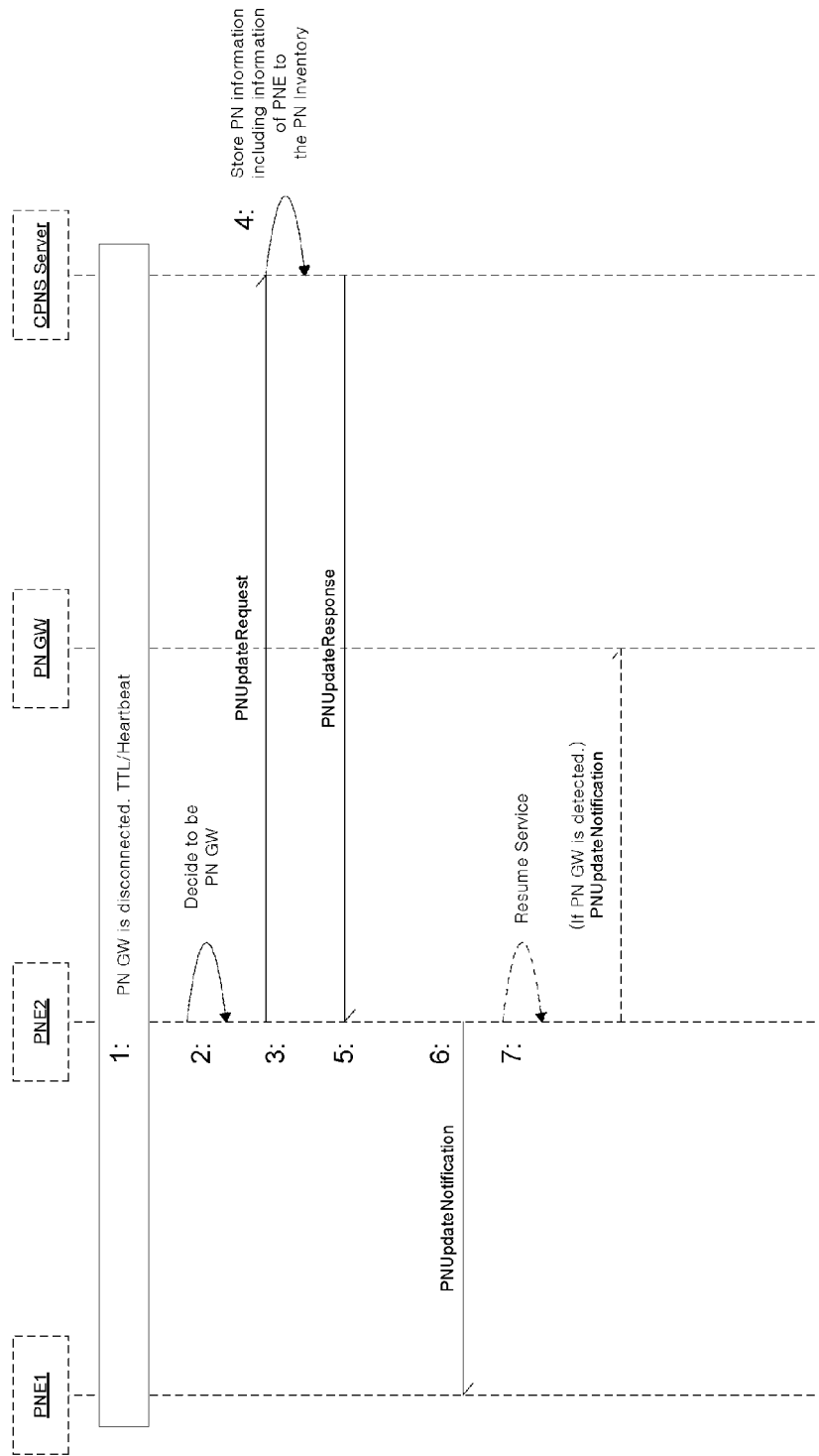
FIG. 14 illustrates an example of a state in which the PNE capable of performing the PN GW function automatically performs mode switching to the PN GW to automatically resume service in a situation in which the current PN GW is disconnected and other PNEs cannot receive a service.

FIG. 14 shows a state in which the PNE capable of performing the PN GW function automatically performs mode switching to the PN GW to automatically resume the service in a situation in which the current PN GW is disconnected and other PNEs cannot receive a service.

PNEs having high second PN GW priority periodically check the PN GW with TTL/heartbeat value and determine that it is disconnected when the PN GW is not detected until the TTL/heartbeat time of the PN GW has passed. If there are several PNEs with second PN GW priority, it is determined that the PN GW is disconnected from all the PNEs and, if one PNE has second PN GW priority, sole determination is possible. At this time, a PNE having highest second PN GW priority automatically performs PN GW mode switching. If this PNE has rights for PN update, it is possible to request PN correction from the CPNS server with PN GW Auth Info or Creator (User) Info.

1. The PNE2 has a PN GW function, and it is determined that the PN GW is disconnected. The PN GW is not detected until TTL/heartbeat time has passed.

2. The PNE having highest Second PN GW Priority or uniquely having Second PN GW Priority automatically determines mode switching.

3. The PNE2 informs the CPNS Server of PN correction. The correction information includes information indicating the current PN GW is changed to the PNE2.

4. The CPNS Server confirms that the requested content is from the PNE2 which is not the PN GW, recognizes that auto mode switching occurs under the state in which the current PN GW cannot perform a service, and checks whether rights are present. If right are present, the PN inventory is changed using the received correction information.

5. The CPNS Server transmits the overall content of the PN inventory which is information necessary to resume the service of the new PN GW to the PNE2.

6. The PNE2 informs other PNEs that the PNE2 becomes the PN GW using the received PN inventory information.

7. The PNE2 resumes services which are not performed because the PN GW is disconnected.

8. The PNE2 serves as the PN GW and immediately informs of the currently changed state if the previous PN GW is connected while the service is resumed. Based on this information, the PN GW determines whether it returns to PN GW.

FIGS. 15-19 show flows when the PN GW in the PN is changed to another outside the PN. That is, it is called to remote PN GW switching.

Figure 15:
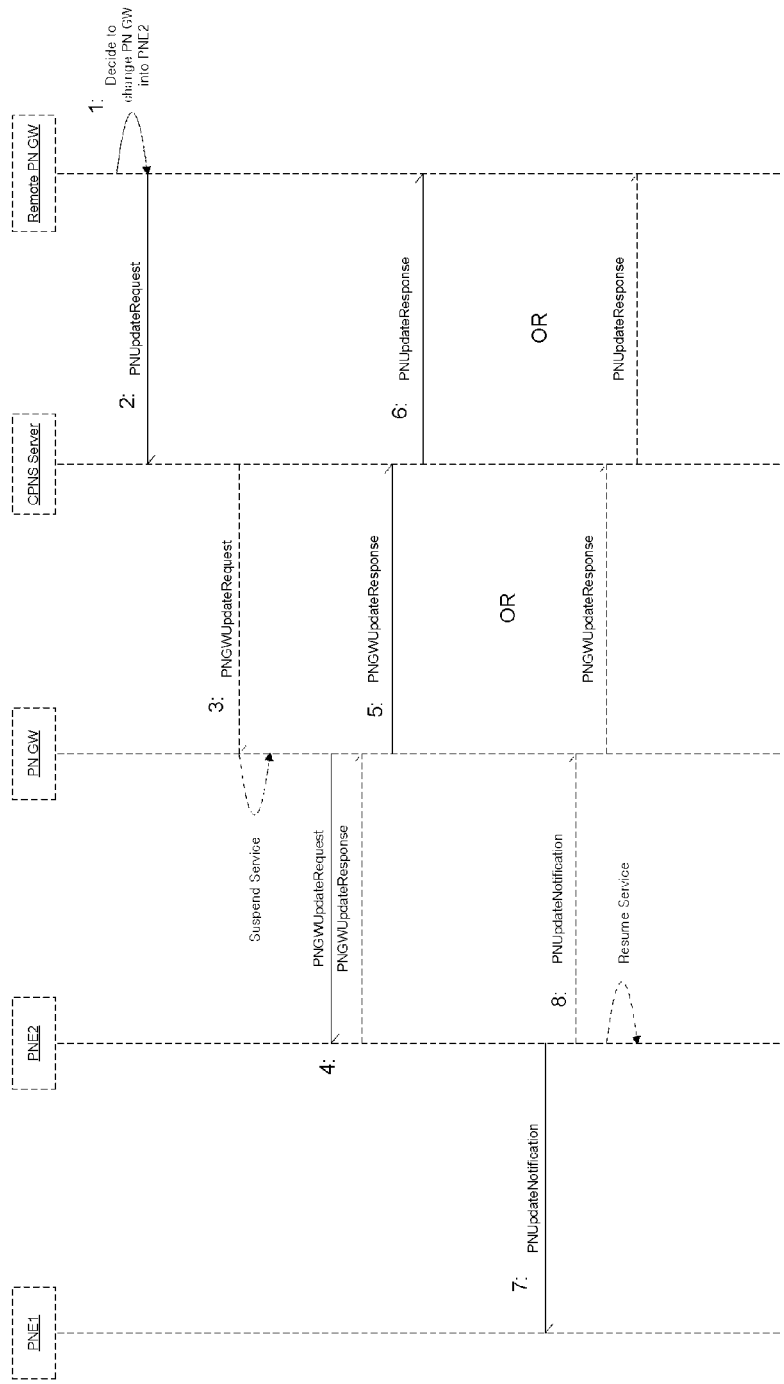
FIGS. 15-19 illustrate examples of flows when the PN GW in the PN is changed to another outside the PN.

The external PN GW is connected to the PN GW of the remote PN via the CPNS server using a device into which the user who may change the PN logs to change the PN GW to another PNE. This shows that mode switching of the PN GW can be performed in addition to the function for accessing the PN GW in the PN with the external PN GW and providing the service. The flow which can perform the above function FIG. 15 show a first embodiment of remote PN GW switching. PN GW requests change from the CPNS server and the CPNS server informs the PN GW of change to stop a service and the PN GW instructs the PNE2 to include the current PN inventory information to become a new PN GW. When a response is received from the PNE2, the CPNS server informs the remote PN GW that PN GW mode switching has been completed. At this time, when the PNE2 notifies each PNE that the PNE1 has been changed to the PN GW, if this information is set to be sent to the previous PN GW, actual mode switching is completed when that notification is included and thus the notification is transmitted later. In general, since the PN GW knows change to the PNE2 and the corresponding information upon request, additional notification is not processed but the above notification is transmitted to the PN GW as compared to the case in which further notification is generated.

Figure 16:
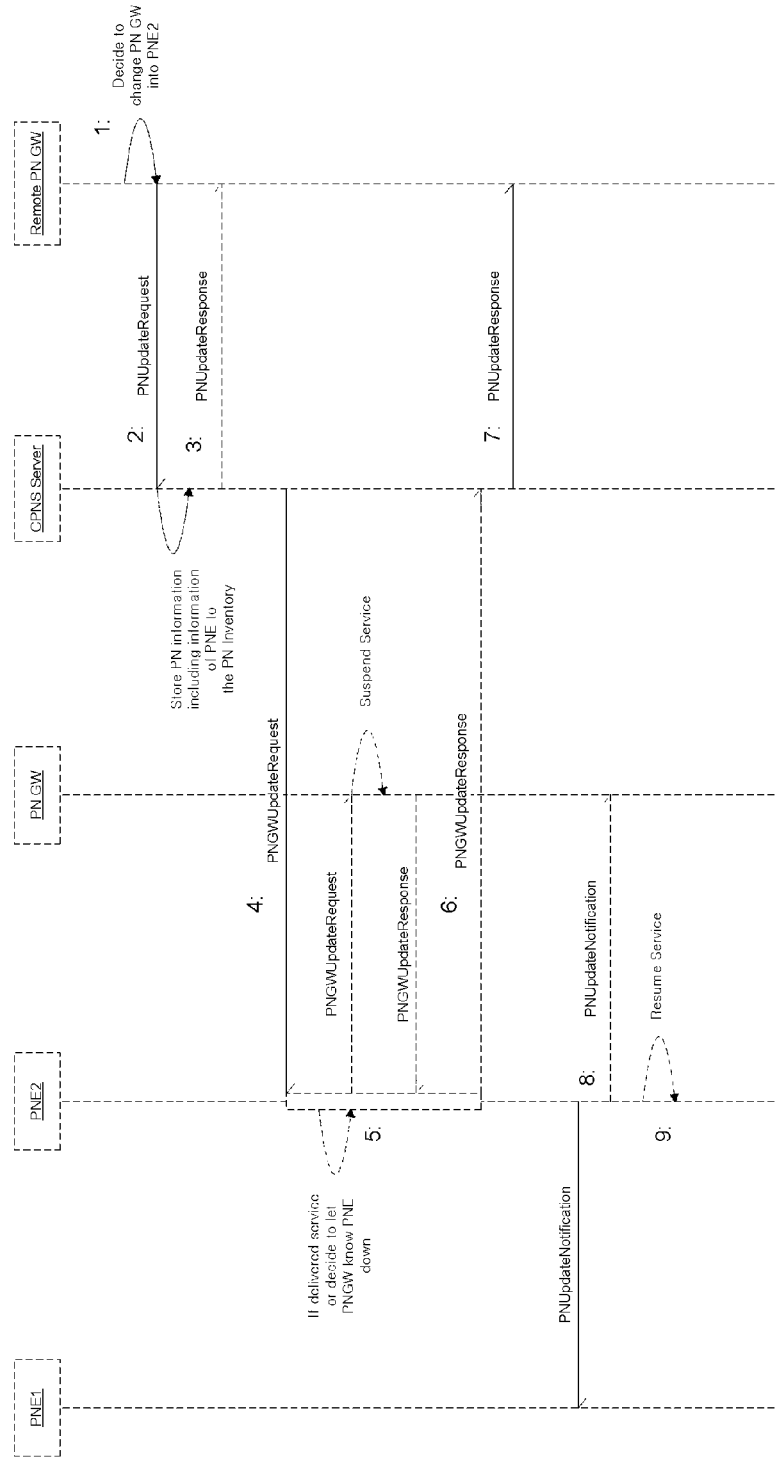
Figure 17:
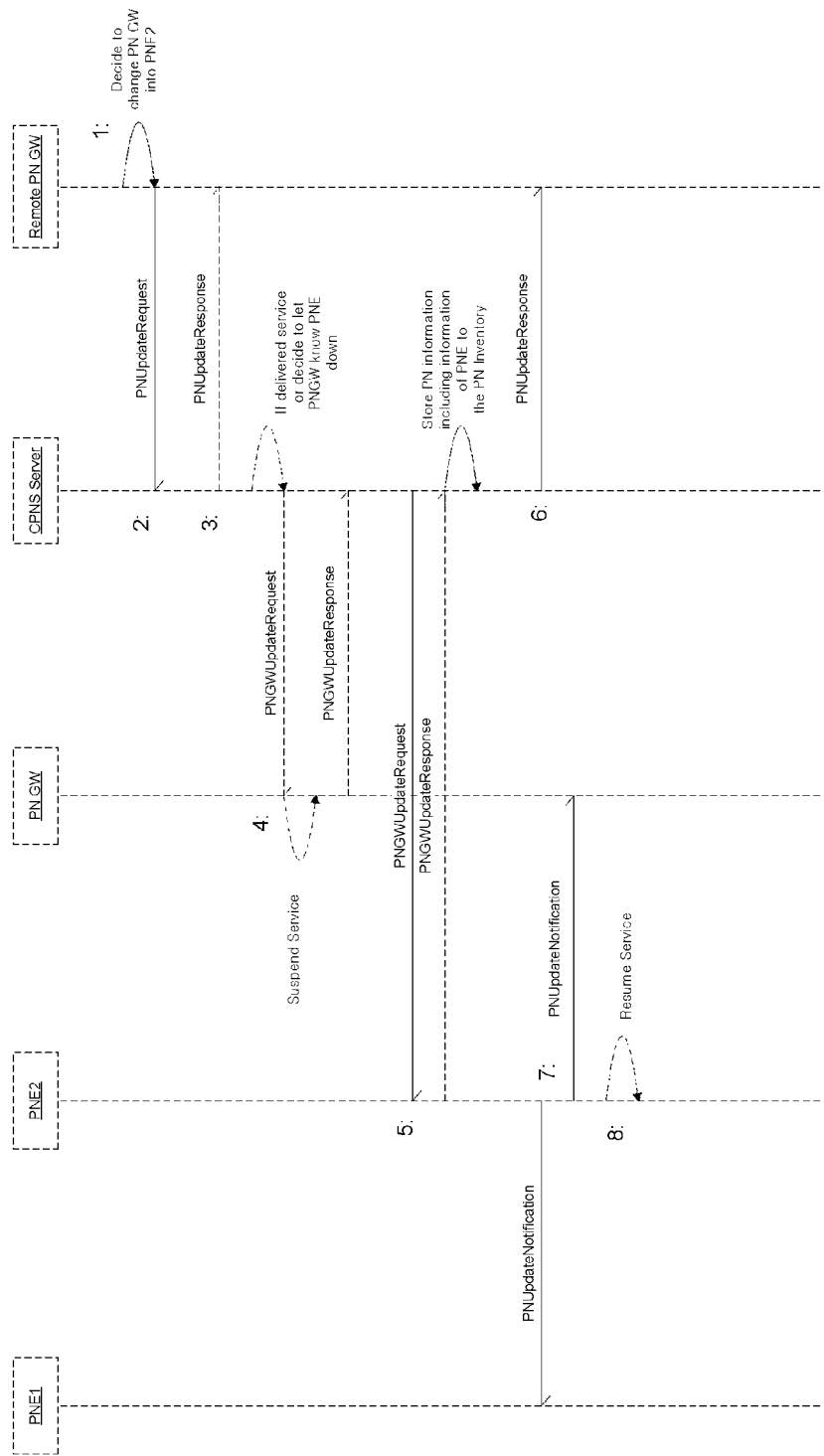

FIGS. 16 and 17 show a second and a third embodiments of remote PN GW switching. The basic matter is equal to that of FIG. 15, the CPNS server directly performs mode switching without the PN GW.

Figure 18:
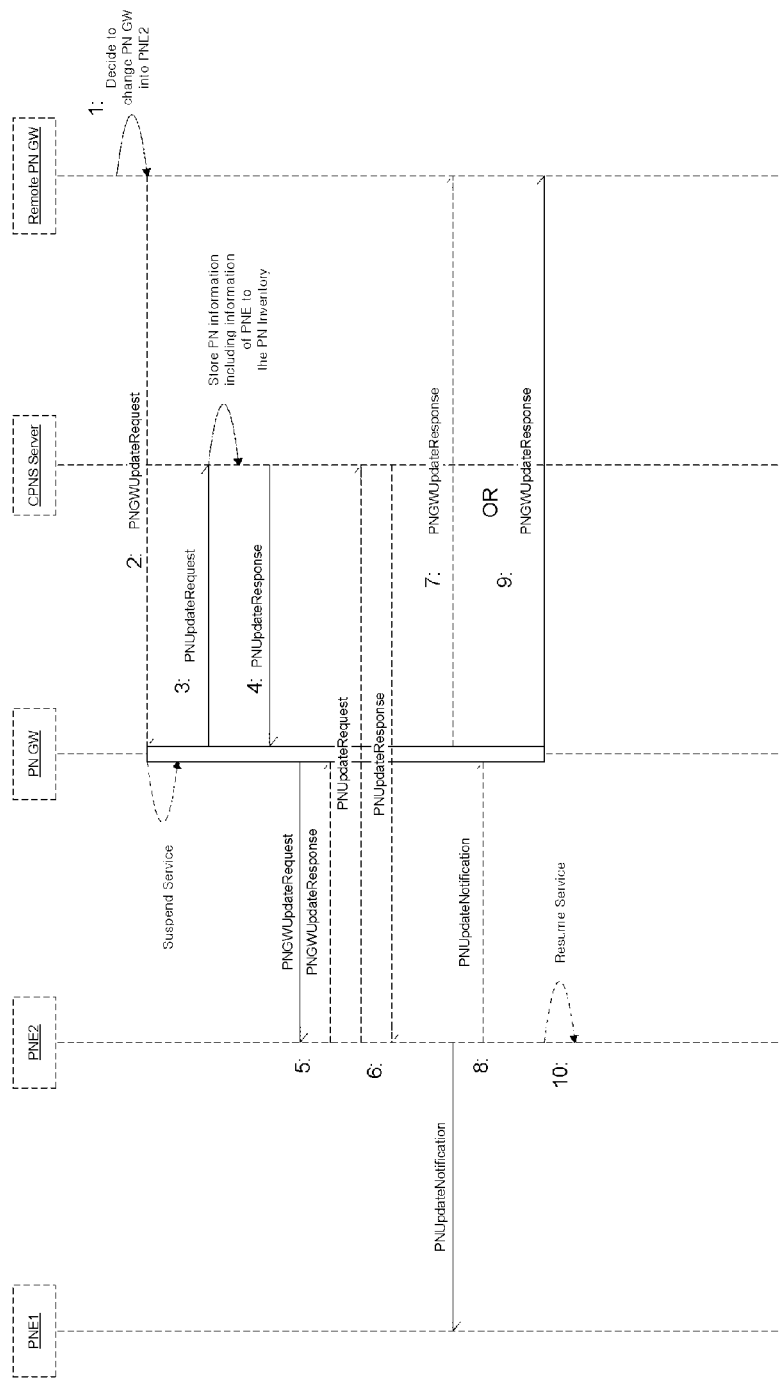

FIG. 18 shows a fourth embodiment of remote PN GW switching. If it is performed through the CPNS server in FIG. 15, FIG. 16 and FIG. 17, the remote PN GW directly instructs mode switching to the PN GW. After the remote PN GW requests PNGWUpdateRequest from the PN GW, the flow is equal to FIG. 11, FIG. 12 and FIG. 13 in which mode switching is determined and performed by mode switching and PNGWUpdateResponse is finally sent after the PN GW completes the mode switching procedure.

Figure 19:
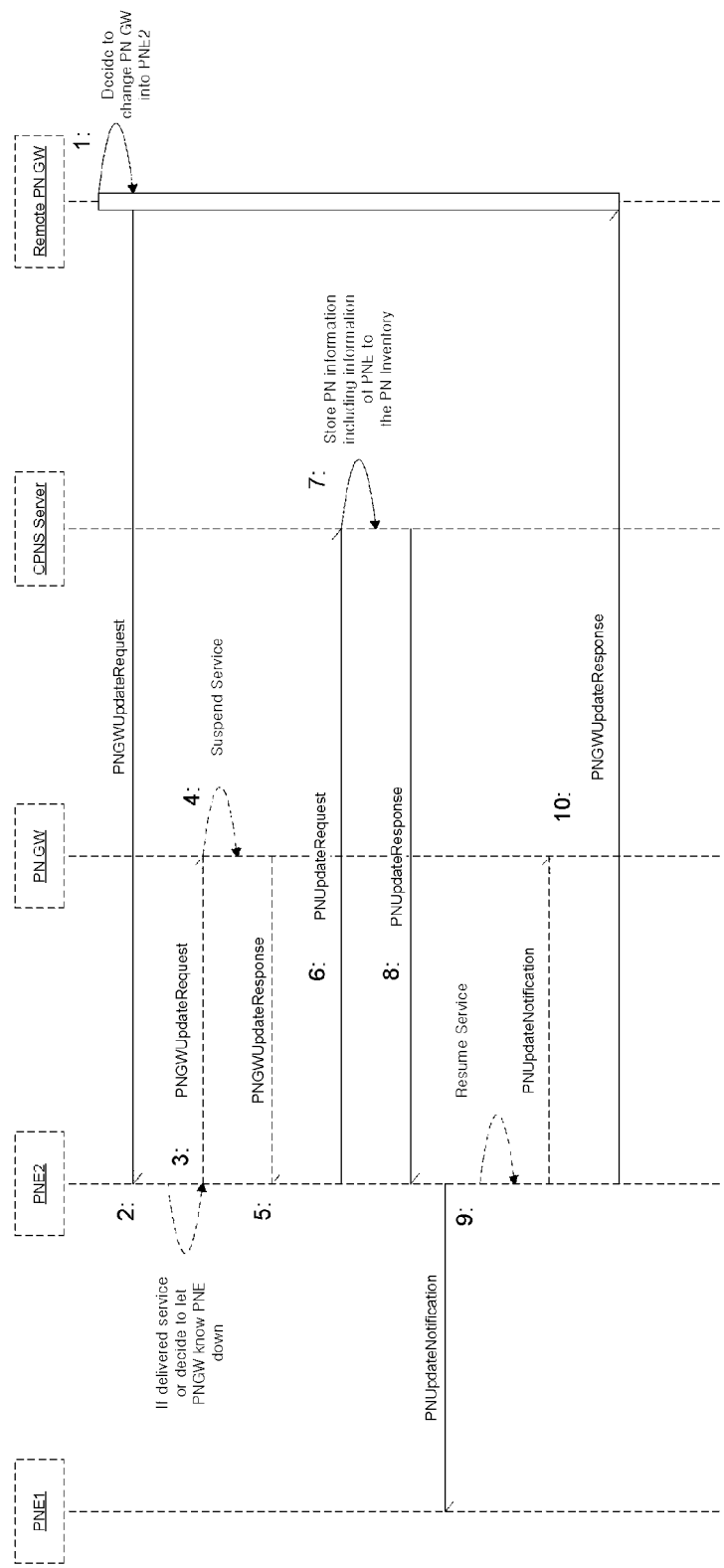

FIG. 19 shows a fifth embodiment of remote PN GW switching. The remote PN GW is directly connected to the PNE2 which serves as the PN GW to request Mode Switching. After PNGWUpdateRequest, the flow is equal to Auto Mode Switching and PNGWUpdateResponse is finally transmitted to the remote PN GW.

The above-described embodiments can be combined. Accordingly, the embodiments can be implemented not only solely but also in a combined manner as necessary. This combination can be easily implemented by those skilled in the art, and thus it will not be described in detail. However, such combination is within the scope of the present invention even if it is not described.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

For example, the method according to the present invention can be stored in a storage medium (e.g., internal memory, flash memory, hard disk, etc.) and be implemented as codes or commands in a software program executable by a processor (e.g., microprocessor). This is described with reference to FIG. 20.

Figure 20:
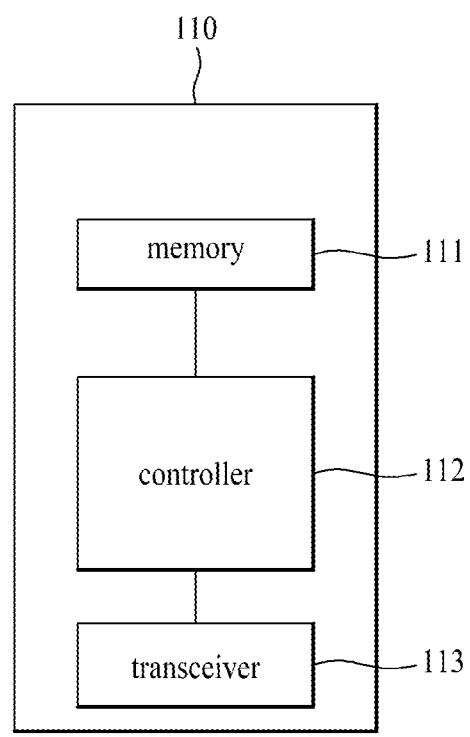
FIG. 20 is a block diagram of a device according to embodiments of the present invention.

FIG. 20 is a block diagram of a device according to the embodiments of the present invention.

As shown in FIG. 20, the first device 110 includes a storage unit 111, a controller 112 and a transceiver 113.

The storage unit 111 stores the methods illustrated in FIGS. 2 to 19.

The controller 112 controls the storage unit 111 and the transceiver 113. Specifically, the controller 112 executes the methods stored in the storage unit 112. The controller 112 transmits the above-mentioned signals through the transceiver.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. The present invention may be embodied by a combination of claims which do not have an explicitly cited relation in the appended claims or may include new claims by amendment after application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

The invention claimed is:

1. A method for communicating with another device through a first device, the method comprising:
   receiving, by the first device, a discovery request message including information regarding a mode of a second device;
   transmitting, by the first device, a discovery response message including information regarding a mode of the first device;
   receiving, by the first device, a gateway change request message for requesting mode switching to a combined mode from the second device;
   transmitting, by the first device, a gateway change response message with a result for the requesting mode switching to the second device; and
   changing, by the first device, the mode of the first device to the combined mode if the first device accepts the requesting mode switching,
   wherein the combined mode is a mode in which the first device operates as both a gateway of a first network and a member of a second network simultaneously.

2. The method according to claim 1, further comprising:
   updating, by the first device, its PN inventory after changing the mode of the first device to the combined mode.

3. The method according to claim 1, wherein the requesting mode switching is accepted if the one or more devices are located outside a coverage of the second network or the one or more devices cannot directly receive a service of the second network through the second device although the one or more devices are located in the coverage of the second network.

4. The method according to claim 1, wherein the requesting mode switching is rejected if all devices that belong to the first network are located in the coverage of the second network and are available to receive the service of the second network.

5. The method according to claim 1, wherein the requesting mode switching is rejected if some devices belonging to the first network are not located in a coverage of the second network, but the remaining devices that need to use a service of the second network are located in the coverage of the second network.

6. The method according to claim 1, wherein available devices are located in a coverage of the second network, support a communication scheme of the second network, and have sufficient power to receive a service of the second network.

7. The method according to claim 1, wherein the requesting mode switching is accepted if the first device is operable in both of the gateway mode and a non-gateway mode simultaneously.

8. The method according to claim 1, further comprising:
   receiving service data of the second network from the second device after the mode of the first device is changed to the combined mode; and
   transmitting the service data to devices in the first network.

9. A device, comprising:
   a transceiver for receiving and/or transmitting signal to other devices; and
   a processor configured to:
      control the transceiver;
      receive a discovery request message including information regarding a mode of a peer device,
      transmit a discovery response message including information regarding a mode of the device,
      receive a gateway change request message for requesting mode switching to a combined mode from the peer device,
      transmit a gateway change response message with a result for the requesting mode switching to the peer device, and
      change the mode of the device from the gateway mode to the combined mode if the device accepts the requesting mode switching,
   wherein the combined mode is a mode in which the device operates as both a gateway of a first network and a member of a second network simultaneously.

* * * * *